United States Patent
Breen et al.

(10) Patent No.: US 7,667,647 B2
(45) Date of Patent: Feb. 23, 2010

(54) EXTENSION OF AIRCRAFT TRACKING AND POSITIVE IDENTIFICATION FROM MOVEMENT AREAS INTO NON-MOVEMENT AREAS

(75) Inventors: Thomas J. Breen, Tyngsboro, MA (US); Alexander E. Smith, McLean, MA (US); Christopher F. Rossano, Chelmsford, MA (US)

(73) Assignee: ERA Systems Corporation, Reston, VA (US)

(*) Notice: Subject to any disclaimer, the term of this patent is extended or adjusted under 35 U.S.C. 154(b) by 272 days.

(21) Appl. No.: 11/545,800

(22) Filed: Oct. 10, 2006

(65) Prior Publication Data

US 2007/0115165 A1  May 24, 2007

Related U.S. Application Data

(63) Continuation-in-part of application No. 11/492,711, filed on Jul. 25, 2006, now Pat. No. 7,429,950, and a continuation-in-part of application No. 11/429,926, filed on May 8, 2006, now Pat. No. 7,477,193, and a continuation-in-part of application No. 11/343,079, filed on Jan. 30, 2006, now Pat. No. 7,375,683, and a continuation-in-part of application No. 11/342,289, filed on Jan. 28, 2006, now Pat. No. 7,576,695, and a continuation-in-part of application No. 11/209,030, filed on Aug. 22, 2005, now Pat. No. 7,248,219, and a continuation-in-part of application No. 11/257,416, filed on Oct. 24, 2005, now Pat. No. 7,495,612, and a continuation-in-part of application No. 11/203,823, filed on Aug. 15, 2005, and a continuation-in-part of application No. 11/145,170, filed on Jun. 6, 2005, now Pat. No. 7,437,250, and a continuation-in-part of application No. 10/743,042, filed on Dec. 23, 2003, now Pat. No. 7,132,982, which is a continuation-in-part of application No. 10/638,524, filed on Aug. 12, 2003, now Pat. No. 6,806,829, which is a continuation of application No. 09/516,215, filed on Feb. 29, 2000, now Pat. No. 6,633,259, said application No. 10/743,042 is a continuation-in-part of application No. 10/319,725, filed on Dec. 16, 2002, now Pat. No. 6,812,890.

(60) Provisional application No. 60/123,170, filed on Mar. 5, 1999, provisional application No. 60/440,618, filed on Jan. 17, 2003.

(51) Int. Cl.
*G01S 3/02* (2006.01)

(52) U.S. Cl. ..................................... 342/450; 342/456

(58) Field of Classification Search ................ 342/450, 342/453, 454, 456; 701/117, 120
See application file for complete search history.

(56) References Cited

U.S. PATENT DOCUMENTS 1,738,571 A   12/1929   Gare ........................... 404/18

(Continued)

FOREIGN PATENT DOCUMENTS

DE   4306660 A1   8/1974

(Continued)

OTHER PUBLICATIONS

World Airport Week, "Sharing Makes the Airport Go Round" Jan. 21, 1997, p. 1.

(Continued)

*Primary Examiner*—Dao L Phan
(74) *Attorney, Agent, or Firm*—Robert Platt Bell (57) ABSTRACT

At most airports, responsibility of air traffic control starts and stops at the entrance or exit to the runway movement areas, which are taxiways and runways. In the non-movement areas, such as hangers, ramps, and aprons, aircraft movements and separation are no longer the responsibility of air traffic control, but is the responsibility of other parties such as the airport itself, airlines, or other parties. The use of tracking technologies for air traffic control is therefore focused on the movement areas, not the non-movement areas, where there are limitations in aircraft tracking. Furthermore, many of the aircraft transmitting devices are switched off in non-movement areas exacerbating tracking problems in these areas. The present invention includes several methods including broadband multilateration, to extend aircraft tracking from the movement areas into non-movement areas without the need to extend special air traffic control equipment into those areas.

4 Claims, 5 Drawing Sheets

U.S. PATENT DOCUMENTS

| | | | |
|---|---|---|---|
| 3,668,403 A | 6/1972 | Meilander | |
| 3,705,404 A | 12/1972 | Chisholm | |
| 3,792,472 A | 2/1974 | Payne et al. | 342/32 |
| 5,569,322 A | 12/1977 | Westerlage et al. | 364/464.27 |
| 4,079,414 A | 3/1978 | Sullivan | 725/114 |
| 4,115,771 A | 9/1978 | Litchford | 343/6 R |
| 4,122,522 A | 10/1978 | Smith | 701/15 |
| 4,167,006 A | 9/1979 | Funatsu et al. | |
| 4,196,474 A | 4/1980 | Buchanan et al. | |
| 4,224,669 A | 9/1980 | Brame | 701/8 |
| 4,229,737 A | 10/1980 | Heldwein et al. | |
| 4,293,857 A | 10/1981 | Baldwin | 343/6.5 |
| 4,315,609 A | 2/1982 | McLean et al. | |
| 4,327,437 A | 4/1982 | Frosch et al. | 714/3 |
| 4,359,733 A | 11/1982 | O'Neill | |
| 4,454,510 A | 6/1984 | Crow | |
| 4,524,931 A | 6/1985 | Nilsson | |
| 4,646,244 A | 2/1987 | Bateman | 701/301 |
| 4,688,046 A | 8/1987 | Schwab | |
| 4,782,450 A | 11/1988 | Flax | |
| 4,811,308 A | 3/1989 | Michel | 367/136 |
| 4,843,397 A | 6/1989 | Galati et al. | 342/59 |
| 4,853,700 A | 8/1989 | Funatsu et al. | 342/30 |
| 4,897,661 A | 1/1990 | Hiraiwa | 342/457 |
| 4,899,296 A | 2/1990 | Khattak | 702/40 |
| 4,910,526 A | 3/1990 | Donnangelo et al. | 342/455 |
| 4,914,733 A | 4/1990 | Gralnick | |
| 4,958,306 A | 9/1990 | Powell et al. | 702/40 |
| 5,001,490 A | 3/1991 | Fichtner | 342/195 |
| 5,001,650 A | 3/1991 | Francis et al. | 364/516 |
| 5,017,930 A | 5/1991 | Stoltz | 342/465 |
| 5,025,382 A | 6/1991 | Artz | 364/439 |
| 5,027,114 A | 6/1991 | Kawashima et al. | 340/941 |
| 5,045,861 A | 9/1991 | Duffett-Smith | 342/457 |
| 5,075,680 A | 12/1991 | Dabbs | 342/52 |
| 5,075,694 A | 12/1991 | Donnangelo et al. | |
| 5,081,457 A | 1/1992 | Motisher et al. | 342/40 |
| 5,089,822 A | 2/1992 | Abaunza et al. | 342/30 |
| 5,113,193 A | 5/1992 | Powell et al. | 342/25 |
| 5,119,102 A | 6/1992 | Barnard | 342/357 |
| 5,132,695 A | 7/1992 | Sumas et al. | 342/461 |
| 5,138,321 A | 8/1992 | Hammer | 342/36 |
| 5,144,315 A | 9/1992 | Schwab et al. | |
| 5,153,836 A | 10/1992 | Fraughton et al. | |
| 5,179,384 A | 1/1993 | De Haan | 342/37 |
| 5,191,342 A | 3/1993 | Alsup et al. | |
| 5,200,902 A | 4/1993 | Pilley | 364/439 |
| 5,225,842 A | 7/1993 | Brown et al. | 342/357 |
| 5,260,702 A | 11/1993 | Thompson | 340/970 |
| 5,262,784 A | 11/1993 | Drobnicki et al. | |
| 5,265,023 A | 11/1993 | Sokkappa | 364/439 |
| 5,268,698 A | 12/1993 | Smith et al. | |
| 5,283,574 A | 2/1994 | Grove | 340/970 |
| 5,311,194 A | 5/1994 | Brown | 342/357 |
| 5,317,316 A | 5/1994 | Sturm et al. | 342/30 |
| 5,317,317 A | 5/1994 | Billaud et al. | 342/30 |
| 5,339,281 A | 8/1994 | Narendra et al. | 367/5 |
| 5,341,139 A | 8/1994 | Billaud et al. | 342/40 |
| 5,365,516 A | 11/1994 | Jandrell | |
| 5,374,932 A | 12/1994 | Wyschogrod et al. | |
| 5,379,224 A | 1/1995 | Brown et al. | 364/449 |
| 5,381,140 A | 1/1995 | Kuroda et al. | |
| 5,402,116 A | 3/1995 | Ashley | |
| 5,406,288 A | 4/1995 | Billaud et al. | 342/37 |
| 5,424,746 A | 6/1995 | Schwab et al. | 342/49 |
| 5,424,748 A | 6/1995 | Pourailly et al. | 342/157 |
| 5,438,337 A | 8/1995 | Aguado | 342/357 |
| 5,448,233 A | 9/1995 | Saban et al. | 340/963 |
| 5,450,329 A | 9/1995 | Tanner | 364/449 |
| 5,454,720 A | 10/1995 | FitzGerald et al. | |
| 5,455,586 A | 10/1995 | Barbier et al. | 342/37 |
| 5,471,657 A | 11/1995 | Gharpuray | 455/12.1 |
| 5,486,829 A | 1/1996 | Potier et al. | 342/40 |
| 5,493,309 A | 2/1996 | Bjornholt | 342/455 |
| 5,506,590 A | 4/1996 | Minter | 342/462 |
| 5,515,286 A | 5/1996 | Simon | 364/461 |
| 5,528,244 A | 6/1996 | Schwab | |
| 5,534,871 A | 7/1996 | Hidaka et al. | 342/113 |
| 5,541,608 A | 7/1996 | Murphy et al. | 342/442 |
| 5,570,095 A | 10/1996 | Drouilhet, Jr. et al. | |
| 5,570,099 A | 10/1996 | DesJardins | 342/378 |
| 5,583,775 A | 12/1996 | Nobe et al. | 364/449.7 |
| 5,590,044 A | 12/1996 | Buckreub | 364/453 |
| 5,596,326 A | 1/1997 | Fitts | |
| 5,596,332 A | 1/1997 | Coles et al. | |
| 5,608,412 A | 3/1997 | Welles, II et al. | 342/457 |
| 5,614,912 A | 3/1997 | Mitchell | 342/146 |
| 5,617,101 A | 4/1997 | Maine et al. | 342/358 |
| 5,627,546 A | 5/1997 | Crow | |
| 5,629,691 A | 5/1997 | Jain | |
| 5,635,693 A | 6/1997 | Benson et al. | 235/384 |
| 5,659,319 A | 8/1997 | Rost et al. | 342/36 |
| 5,666,110 A | 9/1997 | Paterson | 340/970 |
| 5,670,960 A | 9/1997 | Cessat | 342/25 |
| 5,670,961 A | 9/1997 | Tomita et al. | 342/36 |
| 5,677,841 A | 10/1997 | Shiomi et al. | 365/439 |
| 5,680,140 A | 10/1997 | Loomis | |
| 5,686,921 A | 11/1997 | Okada et al. | 342/127 |
| 5,714,948 A | 2/1998 | Farmakis et al. | |
| 5,732,384 A | 3/1998 | Ellert et al. | 701/120 |
| 5,752,216 A | 5/1998 | Carlson et al. | |
| 5,757,314 A | 5/1998 | Aoki | 342/357 |
| 5,774,829 A | 6/1998 | Cisneros et al. | |
| 5,781,150 A | 7/1998 | Norris | |
| 5,784,022 A | 7/1998 | Kupfer | 342/80 |
| 5,793,329 A | 8/1998 | Nakada et al. | 342/357 |
| 5,798,712 A | 8/1998 | Coquin | 340/970 |
| 5,802,542 A | 9/1998 | Coiera et al. | 711/4 |
| 5,825,021 A | 10/1998 | Uemura | 250/222.1 |
| 5,828,333 A | 10/1998 | Richardson et al. | 342/70 |
| 5,839,080 A | 11/1998 | Muller | 701/9 |
| 5,841,391 A | 11/1998 | Lucas, Jr. et al. | 342/34 |
| 5,841,398 A | 11/1998 | Brock | 342/357 |
| 5,850,420 A | 12/1998 | Guillard et al. | 375/316 |
| 5,867,804 A | 2/1999 | Pilley et al. | |
| 5,872,526 A | 2/1999 | Tognazzini | 340/961 |
| 5,884,222 A | 3/1999 | Denoize et al. | 701/301 |
| 5,890,068 A | 3/1999 | Fattouche et al. | 455/456.2 |
| 5,892,462 A | 4/1999 | Tran | 340/961 |
| 5,913,912 A | 6/1999 | Nishimura et al. | 701/35 |
| 5,920,277 A | 7/1999 | Foster et al. | 342/32 |
| 5,920,318 A | 7/1999 | Salvatore, Jr. et al. | 345/418 |
| 5,923,293 A | 7/1999 | Smith et al. | 342/455 |
| 5,949,375 A | 9/1999 | Ishiguro et al. | 342/457 |
| 5,969,674 A | 10/1999 | von der Embse et al. | 342/357.16 |
| 5,977,905 A | 11/1999 | Le Chevalier | 342/163 |
| 5,979,234 A | 11/1999 | Karlsen | 73/170.13 |
| 5,990,833 A | 11/1999 | Ahlbom et al. | 342/417 |
| 5,991,687 A | 11/1999 | Hale et al. | 701/207 |
| 5,995,040 A | 11/1999 | Issler et al. | 342/352 |
| 5,999,116 A | 12/1999 | Evers | |
| 6,043,777 A | 3/2000 | Bergman et al. | 342/357 |
| 6,044,322 A | 3/2000 | Stieler | 701/120 |
| 6,049,304 A | 4/2000 | Rudel et al. | |
| 6,049,754 A | 4/2000 | Beaton et al. | 701/204 |
| 6,075,479 A | 6/2000 | Kudoh | 342/70 |
| 6,081,222 A | 6/2000 | Henkel et al. | 342/45 |
| 6,081,764 A | 6/2000 | Varon | 701/120 |
| 6,085,150 A | 7/2000 | Henry et al. | |
| 6,088,634 A | 7/2000 | Muller | 701/9 |
| 6,092,009 A | 7/2000 | Glover | 701/14 |
| 6,094,169 A | 7/2000 | Smith et al. | |
| 6,122,570 A | 9/2000 | Muller | 701/9 |

| Patent | Kind | Date | Inventor | Class |
|---|---|---|---|---|
| 6,127,944 | A | 10/2000 | Daly | 340/963 |
| 6,133,867 | A | 10/2000 | Eberwine et al. | |
| 6,138,060 | A | 10/2000 | Conner | 701/9 |
| 6,147,748 | A | 11/2000 | Hughes | 356/4.09 |
| 6,161,097 | A | 12/2000 | Glass et al. | 705/6 |
| 6,178,363 | B1 | 1/2001 | McIntyre et al. | 701/16 |
| 6,188,937 | B1 | 2/2001 | Sherry et al. | 701/14 |
| 6,195,040 | B1 | 2/2001 | Arethens | 342/357.12 |
| 6,195,609 | B1 | 2/2001 | Pilley | 701/120 |
| 6,201,499 | B1 | 3/2001 | Hawkes et al. | 342/387 |
| 6,208,284 | B1 | 3/2001 | Woodell et al. | 342/30 |
| 6,208,937 | B1 | 3/2001 | Huddle | 701/221 |
| 6,211,811 | B1 | 4/2001 | Evers | |
| 6,219,592 | B1 | 4/2001 | Muller et al. | |
| 6,222,480 | B1 | 4/2001 | Kuntman et al. | 342/30 |
| 6,225,942 | B1 | 5/2001 | Alon | 342/59 |
| 6,230,018 | B1 | 5/2001 | Watters et al. | 455/456 |
| 6,233,522 | B1 | 5/2001 | Morici | 701/208 |
| 6,239,739 | B1 | 5/2001 | Thomson et al. | 342/96 |
| 6,240,345 | B1 | 5/2001 | Vesel | 701/31 |
| 6,246,342 | B1 | 6/2001 | Vandevoorde et al. | 340/961 |
| 6,253,147 | B1 | 6/2001 | Greenstein | 701/202 |
| 6,271,768 | B1 | 8/2001 | Frazier, Jr. et al. | 340/961 |
| 6,275,172 | B1 | 8/2001 | Curtis et al. | 340/961 |
| 6,275,767 | B1 | 8/2001 | Delseny et al. | 701/120 |
| 6,282,487 | B1 | 8/2001 | Shiomi et al. | 701/120 |
| 6,282,488 | B1 | 8/2001 | Castor et al. | 701/120 |
| 6,289,280 | B1 | 9/2001 | Fernandez-Corbaton | 701/214 |
| 6,292,721 | B1 | 9/2001 | Conner et al. | |
| 6,311,127 | B1 | 10/2001 | Stratton et al. | 701/213 |
| 6,314,361 | B1 | 11/2001 | Yu et al. | 701/120 |
| 6,314,363 | B1 | 11/2001 | Pilley et al. | |
| 6,317,663 | B1 | 11/2001 | Meunier et al. | 701/16 |
| 6,321,091 | B1 | 11/2001 | Holland | 455/456 |
| 6,327,471 | B1 | 12/2001 | Song | 455/440 |
| 6,329,947 | B2 | 12/2001 | Smith | 342/418 |
| 6,337,652 | B1 | 1/2002 | Shiomi et al. | 342/37 |
| 6,338,011 | B1 | 1/2002 | Furst et al. | 701/1 |
| 6,339,745 | B1 | 1/2002 | Novik | 701/208 |
| 6,340,935 | B1 | 1/2002 | Hall | 340/932.2 |
| 6,340,947 | B1 | 1/2002 | Chang et al. | 342/357.01 |
| 6,344,820 | B1 | 2/2002 | Shiomi et al. | 342/174 |
| 6,347,263 | B1 | 2/2002 | Johnson et al. | |
| 6,348,856 | B1 | 2/2002 | Jones et al. | 340/10.1 |
| 6,366,240 | B1 | 4/2002 | Timothy et al. | 342/417 |
| 6,377,208 | B2 | 4/2002 | Chang et al. | 342/357.01 |
| 6,380,869 | B1 | 4/2002 | Simon et al. | 340/945 |
| 6,380,870 | B1 | 4/2002 | Conner et al. | |
| 6,384,783 | B1 | 5/2002 | Smith et al. | |
| 6,393,359 | B1 | 5/2002 | Flynn et al. | 701/120 |
| 6,396,435 | B1 | 5/2002 | Fleischhauer et al. | 342/70 |
| 6,408,233 | B1 | 6/2002 | Solomon et al. | 701/35 |
| 6,414,629 | B1 | 7/2002 | Curico | 342/357.08 |
| 6,415,219 | B1 | 7/2002 | Degodyuk | 70/117 |
| 6,420,993 | B1 | 7/2002 | Varon | 342/36 |
| 6,445,310 | B1 | 9/2002 | Bateman et al. | |
| 6,445,927 | B1 | 9/2002 | Kng et al. | 455/456 |
| 6,448,929 | B1 | 9/2002 | Smith et al. | |
| 6,459,411 | B2 | 10/2002 | Frazier et al. | 342/455 |
| 6,462,674 | B2 | 10/2002 | Ohmura et al. | 340/901 |
| 6,463,383 | B1 | 10/2002 | Baiada et al. | |
| 6,469,654 | B1 | 10/2002 | Winner et al. | 342/33 |
| 6,469,655 | B1 | 10/2002 | Franke et al. | 342/36 |
| 6,469,664 | B1 | 10/2002 | Michaelson et al. | |
| 6,473,027 | B1 | 10/2002 | Alon | 342/37 |
| 6,473,694 | B1 | 10/2002 | Akopian et al. | 701/213 |
| 6,477,449 | B1 | 11/2002 | Conner et al. | |
| 6,492,932 | B1 | 12/2002 | Jin et al. | 342/25 |
| 6,493,610 | B1 | 12/2002 | Ezaki | 701/3 |
| 6,504,490 | B2 | 1/2003 | Mizushima | 340/943 |
| 6,518,916 | B1 | 2/2003 | Ashihara et al. | 342/70 |
| 6,522,295 | B2 | 2/2003 | Baugh et al. | 342/453 |
| 6,531,978 | B2 | 3/2003 | Tran | 342/29 |
| 6,542,809 | B2 | 4/2003 | Hehls, III | 701/120 |
| 6,542,810 | B2 | 4/2003 | Lai | 701/120 |
| 6,545,631 | B2 | 4/2003 | Hudson et al. | 342/30 |
| 6,549,829 | B1 | 4/2003 | Anderson et al. | 701/16 |
| 6,563,432 | B1 | 5/2003 | Millgard | 340/961 |
| 6,567,043 | B2 | 5/2003 | Smith et al. | 342/450 |
| 6,571,155 | B2 | 5/2003 | Carriker et al. | |
| 6,584,400 | B2 | 6/2003 | Beardsworth | 701/120 |
| 6,584,414 | B1 | 6/2003 | Green et al. | 702/33 |
| 6,587,079 | B1 | 7/2003 | Rickard et al. | 342/387 |
| 6,606,034 | B1 | 8/2003 | Muller et al. | |
| 6,606,563 | B2 | 8/2003 | Corcoran, III | 701/301 |
| 6,615,648 | B1 | 9/2003 | Ferguson et al. | 73/146 |
| 6,617,997 | B2 | 9/2003 | Ybarra et al. | 342/29 |
| 6,618,008 | B1 | 9/2003 | Scholz | 342/427 |
| 6,633,259 | B1 | 10/2003 | Smith et al. | |
| 6,657,578 | B2 | 12/2003 | Stayton | 342/30 |
| 6,680,687 | B2 | 1/2004 | Phelipot | 342/29 |
| 6,690,295 | B1 | 2/2004 | De Boer | 340/951 |
| 6,690,618 | B2 | 2/2004 | Tomasi et al. | 367/127 |
| 6,691,004 | B2 | 2/2004 | Johnson | 701/14 |
| 6,707,394 | B2 | 3/2004 | Ishihara et al. | 340/970 |
| 6,710,719 | B1 | 3/2004 | Jones et al. | 340/825.49 |
| 6,710,723 | B2 | 3/2004 | Muller | 340/970 |
| 6,714,782 | B1 | 3/2004 | Monot et al. | 455/431 |
| 6,721,652 | B1 | 4/2004 | Sanqunetti | 701/207 |
| 6,744,396 | B2 | 6/2004 | Stone et al. | 342/36 |
| 6,750,815 | B2 | 6/2004 | Michaelson et al. | 342/357.13 |
| 6,751,545 | B2 | 6/2004 | Walter | 701/120 |
| 6,760,387 | B2 | 7/2004 | Langford et al. | 375/267 |
| 6,765,533 | B2 | 7/2004 | Szajnowski | 342/465 |
| 6,789,011 | B2 | 9/2004 | Baiada et al. | |
| 6,789,016 | B2 | 9/2004 | Bayh et al. | 701/301 |
| 6,792,058 | B1 | 9/2004 | Hershey et al. | 375/347 |
| 6,798,381 | B2 | 9/2004 | Benner et al. | 342/450 |
| 6,799,114 | B2 | 9/2004 | Etnyre | 701/120 |
| 6,801,152 | B1 | 10/2004 | Rose | 342/13 |
| 6,801,155 | B2 | 10/2004 | Jahangir et al. | 342/90 |
| 6,809,679 | B2 | 10/2004 | LaFrey et al. | 342/37 |
| 6,810,329 | B2 | 10/2004 | Koga | 701/211 |
| 6,812,890 | B2 | 11/2004 | Smith et al. | 342/454 |
| 6,816,105 | B2 | 11/2004 | Winner et al. | 342/37 |
| 6,819,282 | B1 | 11/2004 | Galati et al. | 342/37 |
| 6,823,188 | B1 | 11/2004 | Stern | 455/456.1 |
| 6,828,921 | B2 | 12/2004 | Brown et al. | 340/945 |
| 6,845,362 | B2 | 1/2005 | Furuta et al. | 705/13 |
| 6,861,982 | B2 | 3/2005 | Forstrom et al. | 342/387 |
| 6,862,519 | B2 | 3/2005 | Walter | 701/120 |
| 6,862,541 | B2 | 3/2005 | Mizushima | 702/26 |
| 6,865,484 | B2 | 3/2005 | Miyasaka et al. | 701/213 |
| 6,873,269 | B2 | 3/2005 | Tran | 340/961 |
| 6,873,903 | B2 | 3/2005 | Baiada et al. | 701/120 |
| 6,876,859 | B2 | 4/2005 | Anderson et al. | 455/456.1 |
| 6,882,930 | B2 | 4/2005 | Trayford et al. | 701/117 |
| 6,885,340 | B2 | 4/2005 | Smith et al. | 342/465 |
| 6,900,760 | B2 | 5/2005 | Groves | 342/357.14 |
| 6,912,461 | B2 | 6/2005 | Poreda | 701/120 |
| 6,927,701 | B2 | 8/2005 | Schmidt et al. | 340/959 |
| 6,930,638 | B2 | 8/2005 | Lloyd et al. | 342/453 |
| 6,952,631 | B2 | 10/2005 | Griffith et al. | 701/13 |
| 6,963,304 | B2 | 11/2005 | Murphy | 342/357.02 |
| 6,967,616 | B2 | 11/2005 | Etnyre | 342/182 |
| 6,977,612 | B1 | 12/2005 | Bennett | 342/357.07 |
| 6,985,103 | B2 | 1/2006 | Ridderheim et al. | 342/30 |
| 6,985,743 | B2 | 1/2006 | Bajikar | 455/456.1 |
| 6,992,626 | B2 | 1/2006 | Smith | 342/454 |
| 7,006,032 | B2 | 2/2006 | King et al. | 342/29 |
| 7,012,552 | B2 | 3/2006 | Baugh et al. | 340/945 |
| 7,026,987 | B2 | 4/2006 | Lokshin et al. | 342/357.12 |
| 7,030,780 | B2 | 4/2006 | Shiomi et al. | 340/961 |
| 7,043,355 | B2 | 5/2006 | Lai | 701/120 |
| 7,050,909 | B2 | 5/2006 | Nichols et al. | 701/301 |
| 7,053,792 | B2 | 5/2006 | Aoki et al. | 340/928 |

| Patent No. | Date | Inventor | Class |
|---|---|---|---|
| 7,058,506 B2 | 6/2006 | Kawase et al. | 701/201 |
| 7,062,381 B1 | 6/2006 | Rekow et al. | 701/300 |
| 7,065,443 B2 | 6/2006 | Flynn et al. | 701/120 |
| 7,071,843 B2 | 7/2006 | Hashida et al. | 340/995.12 |
| 7,071,867 B2 | 7/2006 | Wittenberg et al. | 342/70 |
| 7,079,925 B2 | 7/2006 | Kubota et al. | 701/1 |
| 7,095,360 B2 | 8/2006 | Kuji et al. | 342/29 |
| 7,102,570 B2 | 9/2006 | Bar-On et al. | 342/465 |
| 7,106,212 B2 | 9/2006 | Konishi et al. | 340/905 |
| 7,109,889 B2 | 9/2006 | He | 340/971 |
| 7,117,089 B2 | 10/2006 | Khatwa et al. | 701/301 |
| 7,120,537 B2 | 10/2006 | Flynn et al. | 701/120 |
| 7,123,169 B2 | 10/2006 | Farmer et al. | 340/945 |
| 7,123,192 B2 | 10/2006 | Smith et al. | 342/455 |
| 7,126,534 B2 | 10/2006 | Smith et al. | 342/456 |
| 7,136,059 B2 | 11/2006 | Kraud et al. | 345/419 |
| 7,142,154 B2 | 11/2006 | Quilter et al. | 342/357.06 |
| 7,148,816 B1 | 12/2006 | Carrico | 340/961 |
| 7,155,240 B2 | 12/2006 | Atkinson et al. | 455/456.2 |
| 7,164,986 B2 | 1/2007 | Humphries et al. | 701/207 |
| 7,170,441 B2 | 1/2007 | Perl et al. | 342/29 |
| 7,170,820 B2 | 1/2007 | Szajnowski | 367/127 |
| 7,187,327 B2 | 3/2007 | Coluzzi et al. | 342/458 |
| 7,190,303 B2 | 3/2007 | Rowlan | 342/29 |
| 7,196,621 B2 | 3/2007 | Kochis | 340/539.13 |
| 7,206,698 B2 | 4/2007 | Conner et al. | 701/301 |
| 7,218,276 B2 | 5/2007 | Teranishi | 342/357.1 |
| 7,218,278 B1 | 5/2007 | Arethens | 342/367.03 |
| 7,221,308 B2 | 5/2007 | Burton et al. | 342/42 |
| 7,228,207 B2 | 6/2007 | Clarke et al. | 701/3 |
| 7,233,545 B2 | 6/2007 | Harvey, Jr. et al. | 367/127 |
| 7,248,963 B2 | 7/2007 | Baiada et al. | 701/120 |
| 7,250,901 B2 | 7/2007 | Stephens | 342/146 |
| 7,257,469 B1 | 8/2007 | Pemble | 701/3 |
| 7,272,495 B2 | 9/2007 | Coluzzi et al. | 701/207 |
| 7,277,052 B2 | 10/2007 | Delaveau et al. | 342/387 |
| 7,286,624 B2 | 10/2007 | Woo et al. | 375/356 |
| 7,307,578 B2 | 12/2007 | Blaskovich et al. | 342/29 |
| 7,308,343 B1 | 12/2007 | Horvath et al. | 701/3 |
| 7,321,813 B2 | 1/2008 | Meunier | 701/10 |
| 7,333,052 B2 | 2/2008 | Maskell | 342/195 |
| 7,333,887 B2 | 2/2008 | Baiada et al. | 701/120 |
| 7,352,318 B2 | 4/2008 | Osman et al. | 342/37 |
| 7,358,854 B2 | 4/2008 | Egner et al. | 340/539.13 |
| 7,379,165 B2 | 5/2008 | Anderson et al. | 356/5.05 |
| 7,382,286 B2 | 6/2008 | Cole et al. | 340/961 |
| 7,383,104 B2 | 6/2008 | Ishii et al. | 701/3 |
| 7,383,124 B1 | 6/2008 | Vesel | 701/200 |
| 7,385,527 B1 | 6/2008 | Clavier et al. | 340/945 |
| 7,391,359 B2 | 6/2008 | Ootomo et al. | 342/37 |
| 7,398,157 B2 | 7/2008 | Sigurdsson et al. | 701/213 |
| 7,400,297 B2 | 7/2008 | Ferreol et al. | 342/377 |
| 7,408,497 B2 | 8/2008 | Billaud et al. | 342/30 |
| 7,408,498 B2 | 8/2008 | Kuji et al. | 342/37 |
| 7,420,501 B2 | 9/2008 | Perl | 342/30 |
| 7,430,218 B2 | 9/2008 | Lee et al. | 370/464 |
| 7,437,225 B1 | 10/2008 | Rathinam | 701/14 |
| 7,440,846 B2 | 10/2008 | Irie et al. | 701/200 |
| 7,457,690 B2 | 11/2008 | Wilson, Jr. | 701/3 |
| 7,460,866 B2 | 12/2008 | Salkini et al. | 455/431 |
| 7,460,871 B2 | 12/2008 | Humphries et al. | 455/456.1 |
| 7,477,145 B2 | 1/2009 | Tatton et al. | 340/531 |
| 7,479,919 B2 | 1/2009 | Poe et al. | 342/30 |
| 7,479,922 B2 | 1/2009 | Hunt et al. | 342/357.02 |
| 7,479,923 B2 | 1/2009 | Carpenter | 342/357.02 |
| 7,479,925 B2 | 1/2009 | Schell | 342/455 |
| 7,487,108 B2 | 2/2009 | Aoki et al. | 705/13 |
| 7,501,977 B2 | 3/2009 | Ino | 342/37 |
| 7,504,996 B2 | 3/2009 | Martin | 342/357.12 |
| 7,515,715 B2 | 4/2009 | Olive | 380/255 |
| 2001/0014847 A1 | 8/2001 | Keenan | 701/117 |
| 2001/0026240 A1 | 10/2001 | Neher | 342/357.07 |
| 2002/0009267 A1 | 1/2002 | Shirakawa | |
| 2002/0021247 A1 | 2/2002 | Smith et al. | |
| 2002/0089433 A1 | 7/2002 | Bateman et al. | 340/970 |
| 2002/0152029 A1 | 10/2002 | Sainthuile et al. | 701/301 |
| 2003/0004641 A1 | 1/2003 | Corwin et al. | 701/301 |
| 2003/0097216 A1 | 5/2003 | Etnyre | 701/120 |
| 2003/0152248 A1 | 8/2003 | Spark et al. | 382/103 |
| 2003/0158799 A1 | 8/2003 | Kakihara et al. | 705/30 |
| 2004/0002886 A1 | 1/2004 | Dickerson et al. | |
| 2004/0004554 A1 | 1/2004 | Srinivasan et al. | 340/870.01 |
| 2004/0039806 A1 | 2/2004 | Miras | 709/223 |
| 2004/0044463 A1 | 3/2004 | Shen-Feng et al. | 701/120 |
| 2004/0086121 A1 | 5/2004 | Viggiano et al. | 380/255 |
| 2004/0094622 A1 | 5/2004 | Vismara | 235/384 |
| 2004/0210371 A1 | 10/2004 | Adachi et al. | 701/50 |
| 2004/0225432 A1 | 11/2004 | Pilley et al. | 701/117 |
| 2004/0266341 A1 | 12/2004 | Teunon | 455/12.1 |
| 2005/0007272 A1 | 1/2005 | Smith et al. | 342/189 |
| 2005/0021283 A1 | 1/2005 | Brinton et al. | 702/150 |
| 2005/0046569 A1 | 3/2005 | Spriggs et al. | 340/551 |
| 2005/0057395 A1 | 3/2005 | Atkinson | |
| 2005/0159170 A1 | 7/2005 | Humphries et al. | 455/456.1 |
| 2005/0166672 A1 | 8/2005 | Atkinson | 73/290 |
| 2005/0192717 A1 | 9/2005 | Tafs et al. | 701/3 |
| 2005/0228715 A1 | 10/2005 | Hartig et al. | 705/13 |
| 2005/0231422 A1 | 10/2005 | Etnyre | 342/182 |
| 2006/0023655 A1 | 2/2006 | Engel et al. | 370/328 |
| 2006/0044184 A1 | 3/2006 | Kimura | 342/357.09 |
| 2006/0052933 A1 | 3/2006 | Ota | 701/200 |
| 2006/0119515 A1 | 6/2006 | Smith | 342/450 |
| 2006/0129310 A1 | 6/2006 | Tarrant et al. | 701/201 |
| 2006/0161340 A1 | 7/2006 | Lee | 701/207 |
| 2006/0167598 A1 | 7/2006 | Pennarola | 701/11 |
| 2006/0181447 A1 | 8/2006 | Kuji et al. | 342/32 |
| 2006/0191326 A1 | 8/2006 | Smith et al. | 73/73 |
| 2006/0208924 A1 | 9/2006 | Matalon | 340/933 |
| 2006/0250305 A1 | 11/2006 | Coluzzi et al. | 342/458 |
| 2006/0262014 A1 | 11/2006 | Shemesh et al. | 342/386 |
| 2006/0265664 A1 | 11/2006 | Simons et al. | 715/722 |
| 2006/0276201 A1 | 12/2006 | Dupray | 455/456.1 |
| 2007/0001903 A1 | 1/2007 | Smith et al. | 342/387 |
| 2007/0040734 A1 | 2/2007 | Evers | 342/126 |
| 2007/0060079 A1 | 3/2007 | Nakagawa et al. | 455/131 |
| 2007/0090295 A1 | 4/2007 | Parkinson et al. | 250/349 |
| 2007/0106436 A1 | 5/2007 | Johansson | 701/23 |
| 2007/0109184 A1 | 5/2007 | Shyr et al. | 342/357.06 |
| 2007/0159356 A1 | 7/2007 | Borel et al. | 340/945 |
| 2007/0159378 A1 | 7/2007 | Powers et al. | 342/29 |
| 2007/0182589 A1 | 8/2007 | Tran | 340/961 |
| 2007/0213887 A1 | 9/2007 | Woodings | 701/1 |
| 2007/0222665 A1 | 9/2007 | Koeneman | 342/29 |
| 2007/0250259 A1 | 10/2007 | Dare | 701/201 |
| 2007/0252750 A1 | 11/2007 | Jean et al. | 342/40 |
| 2007/0298786 A1 | 12/2007 | Meyers et al. | 455/431 |
| 2008/0027596 A1 | 1/2008 | Conner et al. | 701/16 |
| 2008/0042880 A1 | 2/2008 | Ramaiah et al. | 340/958 |
| 2008/0042902 A1 | 2/2008 | Brandwood et al. | 342/465 |
| 2008/0062011 A1 | 3/2008 | Butler et al. | 340/961 |
| 2008/0063123 A1 | 3/2008 | De Mey et al. | 375/350 |
| 2008/0068250 A1 | 3/2008 | Brandao et al. | 342/30 |
| 2008/0088508 A1 | 4/2008 | Smith | 342/453 |
| 2008/0106438 A1 | 5/2008 | Clark et al. | 340/972 |
| 2008/0106457 A1 | 5/2008 | Bartolini et al. | 342/40 |
| 2008/0109343 A1 | 5/2008 | Robinson et al. | 705/37 |
| 2008/0117106 A1 | 5/2008 | Sarno et al. | 342/444 |
| 2008/0120032 A1 | 5/2008 | Brandao et al. | 701/300 |
| 2008/0129601 A1 | 6/2008 | Thomas | 342/465 |
| 2008/0132270 A1 | 6/2008 | Basir | 455/550.1 |
| 2008/0137524 A1 | 6/2008 | Anderson et al. | 370/203 |
| 2008/0150784 A1 | 6/2008 | Zhang et al. | 342/30 |
| 2008/0158040 A1 | 7/2008 | Stayton et al. | 342/32 |
| 2008/0158059 A1 | 7/2008 | Bull et al. | 342/387 |
| 2008/0174472 A1 | 7/2008 | Stone et al. | 342/30 |
| 2008/0183344 A1 | 7/2008 | Doyen et al. | 701/9 |

| | | | |
|---|---|---|---|
| 2008/0186224 A1 | 8/2008 | Ichiyanagi et al. ............ 342/109 |
| 2008/0186231 A1 | 8/2008 | Aljadeff et al. ............... 342/387 |
| 2008/0195309 A1 | 8/2008 | Prinzel, III et al. ............ 701/208 |
| 2008/0231494 A1 | 9/2008 | Galati ............................ 342/37 |
| 2008/0252528 A1 | 10/2008 | Shen et al. .................... 342/451 |
| 2008/0266166 A1 | 10/2008 | Schuchman ...................... 342/97 |
| 2008/0272227 A1 | 11/2008 | Sharpe ........................ 244/3.16 |
| 2008/0275642 A1 | 11/2008 | Clark et al. ................... 701/208 |
| 2008/0294306 A1 | 11/2008 | Huynh et al. .................... 701/3 |
| 2008/0297398 A1 | 12/2008 | Kamimura ...................... 342/38 |
| 2009/0005960 A1 | 1/2009 | Roberts et al. ................ 701/120 |
| 2009/0009357 A1 | 1/2009 | Heen et al. ............... 340/825.09 |
| 2009/0012660 A1 | 1/2009 | Roberts et al. .................... 701/3 |
| 2009/0012661 A1 | 1/2009 | Louis ............................. 701/9 |
| 2009/0015471 A1 | 1/2009 | Shen et al. ............... 342/357.15 |
| 2009/0027270 A1 | 1/2009 | Fisher et al. .................. 342/387 |
| 2009/0051570 A1 | 2/2009 | Clark et al. ................... 340/971 |
| 2009/0055038 A1 | 2/2009 | Garrec et al. .................. 701/17 |

FOREIGN PATENT DOCUMENTS

| | | |
|---|---|---|
| DE | 4204164 A1 | 8/1993 |
| DE | 19751092 A1 | 6/1999 |
| DE | 10149006 A1 | 4/2003 |
| DE | 202004007747 U1 | 9/2004 |
| DE | 202006005089 U1 | 6/2006 |
| DE | 102006009121 A1 | 8/2007 |
| EP | 0265902 A2 | 5/1988 |
| EP | 0466239 | 1/1992 |
| EP | 0514826 A1 | 11/1992 |
| EP | 0550073 A2 | 7/1993 |
| EP | 0574009 A3 | 6/1994 |
| EP | 0613110 A1 | 8/1994 |
| EP | 0613111 A1 | 8/1994 |
| EP | 0614092 A1 | 9/1994 |
| EP | 0629877 A1 | 12/1994 |
| EP | 0355336 B1 | 8/1995 |
| EP | 0670566 A2 | 9/1995 |
| EP | 0682332 A1 | 11/1995 |
| EP | 0505827 B1 | 6/1996 |
| EP | 0385600 B1 | 7/1996 |
| EP | 0732596 A2 | 9/1996 |
| EP | 0487940 B1 | 1/1997 |
| EP | 0774148 A1 | 5/1997 |
| EP | 0578316 B1 | 4/1998 |
| EP | 0346461 A1 | 12/1998 |
| EP | 0915349 A1 | 5/1999 |
| EP | 1022580 A3 | 2/2001 |
| EP | 1118871 A2 | 7/2001 |
| EP | 0877997 B1 | 12/2001 |
| EP | 0778470 B1 | 5/2002 |
| EP | 1202233 A1 | 5/2002 |
| EP | 0865004 B1 | 7/2002 |
| EP | 1109032 B1 | 3/2003 |
| EP | 1300689 A2 | 4/2003 |
| EP | 1331620 A1 | 7/2003 |
| EP | 1345044 A1 | 9/2003 |
| EP | 1369704 A1 | 12/2003 |
| EP | 1302920 B1 | 2/2004 |
| EP | 1396832 A1 | 3/2004 |
| EP | 1406228 A2 | 4/2004 |
| EP | 1070968 B1 | 5/2004 |
| EP | 1431946 A1 | 6/2004 |
| EP | 1467575 A1 | 10/2004 |
| EP | 1471365 | 10/2004 |
| EP | 0903589 B1 | 11/2004 |
| EP | 1517281 A2 | 3/2005 |
| EP | 1531340 A1 | 5/2005 |
| EP | 0926510 B1 | 8/2005 |
| EP | 1405286 B1 | 9/2005 |
| EP | 1485730 B1 | 9/2005 |
| EP | 1428195 B1 | 10/2005 |
| EP | 1603098 A1 | 12/2005 |
| EP | 1125415 B1 | 1/2006 |
| EP | 1205732 B1 | 3/2006 |
| EP | 1632787 A1 | 3/2006 |
| EP | 1632892 A2 | 3/2006 |
| EP | 0953261 B1 | 6/2006 |
| EP | 1275975 B1 | 6/2006 |
| EP | 1285232 B1 | 6/2006 |
| EP | 1672384 A2 | 6/2006 |
| EP | 0987562 B1 | 7/2006 |
| EP | 1093564 B1 | 11/2006 |
| EP | 1218694 B1 | 11/2006 |
| EP | 1727094 A2 | 11/2006 |
| EP | 1742170 A1 | 1/2007 |
| EP | 1188137 B1 | 2/2007 |
| EP | 1755356 A1 | 2/2007 |
| EP | 1463002 B1 | 4/2007 |
| EP | 1361555 B1 | 5/2007 |
| EP | 1798572 A1 | 6/2007 |
| EP | 1410364 B1 | 10/2007 |
| EP | 1843161 A2 | 10/2007 |
| EP | 1860456 A1 | 11/2007 |
| EP | 1884462 A1 | 2/2008 |
| EP | 1101385 B1 | 3/2008 |
| EP | 1901090 A1 | 3/2008 |
| EP | 0964268 B1 | 4/2008 |
| EP | 1483755 B1 | 4/2008 |
| EP | 1906204 A2 | 4/2008 |
| EP | 1912077 A2 | 4/2008 |
| EP | 1331490 B1 | 6/2008 |
| EP | 1942351 A1 | 7/2008 |
| EP | 1327159 B1 | 8/2008 |
| EP | 1436641 B1 | 8/2008 |
| EP | 1953565 A1 | 8/2008 |
| EP | 1483902 B1 | 9/2008 |
| EP | 1965219 A1 | 9/2008 |
| EP | 1972962 A2 | 9/2008 |
| EP | 1975884 A1 | 10/2008 |
| EP | 1118011 B1 | 11/2008 |
| EP | 1995708 A1 | 11/2008 |
| EP | 2000778 A2 | 12/2008 |
| EP | 2001004 A2 | 12/2008 |
| EP | 2023155 A1 | 2/2009 |
| FR | 2708349 A1 | 2/1995 |
| FR | 2791778 A1 | 10/2000 |
| FR | 2881841 A1 | 8/2006 |
| JP | 9-288175 A | 11/1994 |
| JP | 6-342061 A | 12/1994 |
| JP | 8-146130 A | 5/1996 |
| JP | 9-119983 A | 11/1997 |
| WO | WO9205456 A1 | 4/1992 |
| WO | WO 94/014251 | 6/1994 |
| WO | WO9427161 A1 | 11/1994 |
| WO | WO9428437 A1 | 12/1994 |
| WO | WO9503598 A1 | 2/1995 |
| WO | WO9521388 A1 | 8/1995 |
| WO | WO9605562 A1 | 2/1996 |
| WO | WO9635961 A1 | 11/1996 |
| WO | WO9726552 A2 | 7/1997 |
| WO | WO9747173 A2 | 12/1997 |
| WO | WO9804965 A2 | 2/1998 |
| WO | WO9805977 A1 | 2/1998 |
| WO | WO9814926 A1 | 4/1998 |
| WO | WO9822834 A1 | 5/1998 |
| WO | WO9822923 A1 | 5/1998 |
| WO | WO9835311 A1 | 8/1998 |
| WO | WO9843107 A1 | 10/1998 |
| WO | WO9849654 A1 | 11/1998 |
| WO | WO9908251 A1 | 2/1999 |
| WO | WO9935630 A1 | 7/1999 |
| WO | WO9942855 A1 | 8/1999 |
| WO | WO9945519 A2 | 9/1999 |
| WO | WO 99/50985 | 10/1999 |
| WO | WO9950985 | 10/1999 |

| | | |
|---|---|---|
| WO | WO9956144 A1 | 11/1999 |
| WO | WO0023816 A1 | 4/2000 |
| WO | WO0039775 A2 | 7/2000 |
| WO | WO0111389 A1 | 2/2001 |
| WO | WO0133302 A2 | 5/2001 |
| WO | WO0148652 A1 | 7/2001 |
| WO | WO0157550 A1 | 8/2001 |
| WO | WO0159601 A1 | 8/2001 |
| WO | WO0163239 A1 | 8/2001 |
| WO | WO0165276 A1 | 9/2001 |
| WO | WO0186319 | 11/2001 |
| WO | WO 0186319 | 11/2001 |
| WO | WO0194969 A2 | 12/2001 |
| WO | WO0205245 A2 | 1/2002 |
| WO | WO0208784 A1 | 1/2002 |
| WO | WO0215151 A1 | 2/2002 |
| WO | WO0227275 A2 | 4/2002 |
| WO | WO02054103 A2 | 7/2002 |
| WO | WO02059838 A2 | 8/2002 |
| WO | WO02066288 A1 | 8/2002 |
| WO | WO02069300 A1 | 9/2002 |
| WO | WO02075667 A1 | 9/2002 |
| WO | WO02091312 A2 | 11/2002 |
| WO | WO02095709 A2 | 11/2002 |
| WO | WO 02/099769 | 12/2002 |
| WO | WO02099769 | 12/2002 |
| WO | WO03013010 A1 | 2/2003 |
| WO | WO03016937 A1 | 2/2003 |
| WO | WO03023439 A2 | 3/2003 |
| WO | WO03027934 A1 | 4/2003 |
| WO | WO03054830 A2 | 7/2003 |
| WO | WO03056495 A1 | 7/2003 |
| WO | WO03060855 A1 | 7/2003 |
| WO | WO03067281 A1 | 8/2003 |
| WO | WO03079136 A2 | 9/2003 |
| WO | WO03081560 A1 | 10/2003 |
| WO | WO03093775 A2 | 11/2003 |
| WO | WO03096282 A1 | 11/2003 |
| WO | WO03098576 A1 | 11/2003 |
| WO | WO03107299 A2 | 12/2003 |
| WO | WO2004042418 A1 | 5/2004 |
| WO | WO2004068162 A2 | 8/2004 |
| WO | WO2004109317 A2 | 12/2004 |
| WO | WO2004114252 A1 | 12/2004 |
| WO | WO2005038478 A2 | 4/2005 |
| WO | WO2005052887 A1 | 6/2005 |
| WO | WO2005081012 A1 | 9/2005 |
| WO | WO2005081630 A2 | 9/2005 |
| WO | WO2005114613 A1 | 12/2005 |
| WO | WO2005121701 A2 | 12/2005 |
| WO | WO2005017555 A2 | 5/2006 |
| WO | WO2006070207 A1 | 7/2006 |
| WO | WO2006079165 A1 | 8/2006 |
| WO | WO2006093682 A2 | 9/2006 |
| WO | WO2006108275 A1 | 10/2006 |
| WO | WO2006110973 A1 | 10/2006 |
| WO | WO2006135916 A1 | 12/2006 |
| WO | WO2006135923 A2 | 12/2006 |
| WO | WO2007001660 A2 | 1/2007 |
| WO | WO2007010116 A1 | 1/2007 |
| WO | WO2007012888 A1 | 2/2007 |
| WO | WO2007013069 A1 | 2/2007 |
| WO | WO2007048237 A1 | 5/2007 |
| WO | WO2007086899 A2 | 8/2007 |
| WO | WO2006088554 A1 | 9/2007 |
| WO | WO2007113469 A1 | 10/2007 |
| WO | WO2007115246 A1 | 10/2007 |
| WO | WO2007120588 A2 | 10/2007 |
| WO | WO2007124300 A2 | 11/2007 |
| WO | WO2008001117 A1 | 1/2008 |
| WO | WO2008005012 A1 | 1/2008 |
| WO | WO2008012377 A1 | 1/2008 |
| WO | WO2008018088 A1 | 2/2008 |
| WO | WO2008051292 A2 | 5/2008 |
| WO | WO2008053173 A1 | 5/2008 |
| WO | WO2008065328 A2 | 6/2008 |
| WO | WO2008065658 A1 | 6/2008 |
| WO | WO2008068679 A1 | 6/2008 |
| WO | WO2008093036 A2 | 8/2008 |
| WO | WO2008116580 A1 | 10/2008 |
| WO | WO2008126126 A2 | 10/2008 |
| WO | WO2008144784 A1 | 12/2008 |
| WO | WO2008145986 A2 | 12/2008 |
| WO | WO2009001294 A2 | 12/2008 |
| WO | WO2009004381 A1 | 1/2009 |

OTHER PUBLICATIONS

Huaiying Tan et al. *PCL System With Illuminator of Opportunity* Proceedings of 2006 CIE International Conference on Radar, vol. 1,Octoebre 16, 2006.

Griffiths H D et al., *Denial of Bistatic Hosting by Spatial-Temporal Waveform Design* IEE Proceedings: Radar, Sonar & Navigation, Institution of Electrical Engineers, GB, vol. 152, No. 2, Apr. 8, 2005.

Jafargholi et al, *High Accurate Multiple Target Detection in PCL Radar Systems*, Radar, 2006, CIE '06. International Conference on, IEEE, PI, Oct. 1, 2006.

Terminal, Landing Fees Increase, Dianne Gouliquer, Northern Ontario Business, Sudbury, Apr. 1, 2001, vol. 21, Issue 6, p. 24.

Conflict Detection and Resolution for Future Air Transport Management, Jimmy Krozel, Ph.D, Mark E. Peters, and George Hunter, TR 97138-01, NASA Ames Research Center, Contract NAS2-14285, Apr. 1997.

ADS-X—Next Generation Surveillance Solutions, Alex Smith, Russell Hulstron, Rannoch Corporation, ATCA Oct. 2006.

Transtech Airport Solutions, Inc., http://www.transtech-solutions.com/products/asm/airport.html, Feb. 12, 2009.

Eurocontrol Standard Document for Surveillance Interchange Part 14: Category 020, Multilateration Target Reports, SUR.ET1.ST05.2000-STD-14-02, Apr. 2008.

ATO Advanced Technology Development and Prototyping Group, http://222.faa.gov/about/office_org/headquarters_offices/ato/service_units/operations/td/.. Jan. 16, 2008.

Form B —Proposal Summary, NASA SBIR 02-1 Solicitation, http://sbir.nasa.gov/SBIR/abstracts/02/sbir/phase1/SBIR-02-1-A3.01-9714.html Sep. 05, 2002.

Form 9B—Project Summary, NASA SBIR 00-1 Soliciation http://sbir.nasa.gov/SBIR/abstracts/00/sbir/phase1/SBIR-00-1-04.01-9704.html Feb. 12, 2009.

NASA 1998 SBIR Phase 1, Proposal No. 91-1 01.02-9780B (1998) http://sbir.nasa.gov/SBIR/abstracts/98/sbir/phase1/SBIR-98-1-01.02-9780B.html.

"UK ADS-B in radar environment" (Mark Watson) http://www.eurocontrol.int/cascade/gallery/content/public/documents/Presentations/Session%20%202 %20-%20Trials%20and%20Implementations/Watson%20-%20UK%20ADS-B%20in%20a%20radar%20environment.pdf (2006).

Ground Vehicle Operations on Airports, FAA Advisory Circular AC No. 150/5210-20 Jun. 21, 2002.

Airport Pavement Management Systems: An Appraisal of Erxisting Methodologies, Michel Gendreau and Patrrick Soriano;Pergamon Transn Res. A, vol. 32, No. 3, pp. 187-214, 1998.

*Components of a Pavement Maintenance Management System*, Mohamed Y. Shahin, U.S. Army Construction Engineering Research Laboratory, Transportaiton Research Record 791, pp. 31-39, 1980.

*Application of Markov Process to Pavement Management Systems at the Network Level*, Abbas Ahmad Butt, University of Iillinois at Urbana-Champaign (1991).

Need for Accurate Traffic Data in Pavement Management, John F. Kennedy International Airport Case Studt, Keegan, Handojo, Rada, MACTEX Engineering and Consulting, Inc, 2004 FAA Worldwide Airport Technology Transfer Conference, Apr. 2004.

PCL system with illuminator of opportunity, Huaiying tan, Min ren, Bo lie, Jinning Song, Beijing Radar Instiitute, IEEE 0-7803-9582-4/06, Apr. 2006.

High Accurate Multiple Target Detection in PCL Radar Systems; Jafargholi, A. Mousavi, M. R. Nayebi, M. M. K. N. Toosi University of Technology Department of Electrical Engineering, Tehran, Iran; Radar, 2006. CIE '06. International Conference on, Oct. 2006, Shanghai, China; ISBN: 07-7803-9583-2.

Denial of bistatic hosting by spatial-temporal waveform design; H.D. Griffiths, M.G. Wicks, D. Weinder, R. Adve, P.A. Antonik, and I. Fotinopoulos, IEE Proc. Radar Sonar Navig., vol. 152, No. 2, Apr. 2005.

Passive coherent location FPGA implementation of the cross ambiguity function; Kvasnicka, M. Hermanek, A. Kunes, M. Pelant, M. Plsek, R., Proceedings- SPIE The International Society for Optical Engineering; 2006, vol. 6159; Part 1, pp. 615918; International Society for Optical Engineering.

Passive coherent location system simulation and evaluation, Proc. SPIE, vol. 6159, 615917 (2006); DOI: 10.1117/12.675065 , Apr. 26, 2006 ; Conference Title: Photonics Applications in Astronomy, Communications, Industry, and High-Energy Physics Experiments IV Libor Slezák, Michael Kvasnicka, Martin Pelant, and Jit Vavra *ERA a.s.* (*Czech Republic*) Radek Plsek *Technical Univ. Of Pardubice* (*Czech Republic*).

World Airport Week, "Sharing Makes the Airport Go Round" Jan. 21, 1997, p. 1.

Traffic Alert System Technical Design Summary, Final Report, Apr. 1994 (Baldwin et al.).

GPS Relative Accuracy for Collision Avoidance, Institute of Navigation Technical Meeting, Jan. 1997 (Rudel et al.).

Cassell, R., Smith A., Cohen, B.,M Yang, E., Sleep, B., A Prototype Aircraft Performance Risk Assessment Model, Final Report, Rannoch Corporation, Feb. 28, 2002.

Cassell, R., Smith A., Cohen, B., Yang, E., Sleep, B., Esche, J., Aircraft Performance Risk Assessment Model (APRAM), Rannoch Corporation, Nov. 30, 2002.

Cox, E., A., Fuzzy Logic For Business and Industry, Charles River Media, 1995, Chapter 5.

Smith, A., Cassell, R., Cohen, B., An approach to Aircraft Performance Risk Assessment Modeling, Final Report, Rannoch Corporation, Mar. 1999.

M.L. Wood and R. W. Bush, "Multilateration on Mode S and ATCRBS Signals at Atlanta's Hartsfield Airport", Lincoln Laboratory, M.I.T., Jan. 8, 1998.

AERMOD: Description of Model Formulation (Version 02222) EPA 454/R-02-002d, Oct. 21, 2002.

FAA Integrated Noise Model, www.faa.gov, current release INM 6.1 (Mar. 4, 2003).

"Flight Explorer News: Flight Explorer and Lochard Team to Provide Enhanced Flight Tracking for Cutomers Worldwide", Apr. 28, 2003, http://www.flightexplorer/com/News/press%20releases/pr042803.asp.

Source Code received by Rannoch Corp. from FAA, circa 1998.

"A Routine that converts an American Mode S address into its corresponding 'N' number string", Ken Banis, Feb. 17, 1992.

"Description of the U.S. Algorithm for Assigning Mode A Addresses", Robert D. Grappel, M.I.T. Lincoln Laboratory, Nov. 1991.

"Program to convert Mode S address to U.S. Tail Number", R.D. Grappel, M.I.T. Lincoln Laboratory, 1991.

"Program to convert U.S. aircraft tail numbers to Mode S code", R.D. Grappel, M.I.T. Lincoln Laboratory, 1991.

"ADSE and Multilateration Mode-S Data Fusion for Location and Identification on Airport Surface", J.G. Herraro J.A. Portas, F.J. Rodriguez,(*IEEE 1999 Radar Conference Proceedings*, pp. 315-320, Apr. 20-22, 1999).

D.C. Rickard, D.J.Sherry, S.J.Taylor, "The development of a prototype aircraft-height monitoring unit utilising an SSR-based difference in time of arrival technique", International Conference Radar 92 (Conf. Publ. No. 365), 1992, p. 250-3.

D. E. Manolakis and C. C. Lefas, "Aircraft geometric height computation using secondary surveillance radar range differences," IEE Proceedings-F, Radar, Sonar, Navigation, vol. 141, No. 2, pp. 139-148, 1994.

Request for Proposal for Acquisition of Airport Noise and Operations Monitoring System (NOMS), Indianapolis Airport Authority, Oct. 21, 2003.

Technical Specifications, for Aircraft Flight Track and Noise Management System for the Regional Airport Authority of Louisville and Jefferson County, Harris Miller, Miller & Hanson Inc. 15 New England Executive Park Burlington, MA 01803 HMMH Report No. 298950, May 16, 2003.

"Overview of the FAA ADS-B Link Decision", John Scardina, Director, Office of System Architecture and Investment Analysis, Federal Aviation Administration, Jun. 7, 2002.

"Ground-Based Transceiver (GBT) for Broadcast Services Using the Universal Access Transceiver (UAT) Data Link", FAA-E-2973, Department of Transportation, Federal Aviation Administration, Jan. 15, 2004.

"Wide Area Multilateration Report on EATMP TRS 131/04 Version 1.1", NLR-CR-2004-472, Roke Manor, Nov. 2004.

J.G. Herrero, J. A. B. Portas, F.J.J. Rodriguez, J.R.C. Corredera, ASDE and Multilateration Mode-S Data Fusion for Location and Identification on Airport Surface, (*IEEE 1999 Radar Conf. Proc.*, pp. 315-320, Apr. 20-22, 1999).

D.C. Rickard, D.J. Sherry, S.J. Taylor, The development of a prototype aircraft-height monitoring unit utilizing an SSR-based difference in time of arrival technique, Int'l Conference Radar 92 (Conf. Publ. No. 365), 1992, p. 250-3.

D. E. Manolakis and C. C. Lefas, Aircraft geometric height computation using secondary surveillance radar range differences, IEE Proceedings-F, Radar, Sonar, Navigation, vol. 141, No. 2, pp. 139-148, 1994.

GPS Risk Assessment Study, Final Report, T.M. Corrigan et al., Johns Hopkins Univ., Applied Physics Laboratory, Jan. 1999.

ASA MASPS—Change Issue, James Maynard, Oct. 21, 2002.

ADS-B, Automatic Dependent Surveillance—Broadcast Will ADS-B Increase Safety and Security for Aviation?, Mar. 1999, revised Jul. 2000, Darryl H. Phillips AirSport Corporation, 1100 West Cherokee Sallisaw OK 74955.

ASA MASPS—Change Issue, Greg Stayton, Aug. 1, 2002.

ASA MASPS—Change Issue, Michael Petri, Oct. 23, 2002.

ASA MASPS—Change Issue, J. Stuart Searight, Nov. 18, 2002.

ASA MASPS—Change Issue, Michael Petri, Dec. 16, 2002.

Protest Letter dated May 16, 2002 from Otto M. Wildensteiner, U.S. Department of Transportation, Washington, DC.

"Comparison of Claims in U.S. Appl. No. 09/971,672 with Prior Art", May 16, 2002, Otto M. Wildensteiner, Department of Transportation, Washington, DC.

"Minimum Aviation System Performance Standards for Automatic Dependent Surveillance Broadcast (ADS-B)", RCTA, Inc. Washington, DC, © 1998.

"Runway Incursion Reduction Program Dallas-Ft. Worth Formal Evaluation Report, Final Report", Trios Associates, Inc. Dec. 21, 2000.

"TIS-B DFW Application for Airport Surface Situational Awareness", Trios Associates, Inc., Sep. 6, 2000.

"A Prototype Transceiver for Evaluating An Integrated Broadcast Data Link Architecture", Chris Moody & Warrent Wilson, RCTA SC-186, Aug. 17, 1995, TRCA Paper No. 449-95/SC186-033.

"The Universal Access Transceiver (UAT)", Warren Wilson & Chris Moody, May 10, 1995.

"Terminal Area Productivity (TAP) Study Low Visibility Landing and Surface Operations (LVLASO) Demonstration Report" Surface Surveillance Products Team (AND-410) Sep. 4, 1998.

"Phase I—Operational Evaluation Final Report Cargo Airline Association ADS-B Program, FAA SafeFlight 21 Program" Apr. 10, 2000.

"Capstone Program Plan Version 1.0", Federal Aviation Administration, Mar. 10, 1999.

"TIS-B Concept and Approach", MITRE, Chris Moody, Feb. 29, 2000.

"RTCA Special Committee 186, Working Group 5 ADS-B UAT MOPS Meeting #2, Proposed Contents and Transmission Rates for ADS-B Messages" Chris Moody, MITRE Corp., Feb. 20, 2001.

"Airborne Information Initiatives: Capitalizing on a Multi-Purpose Broadcast Communications Architecture", R.C. Strain, J.C. Moody, E.C. Hahn, B.E. Dunbar, S. Kavoussi, J.P. Mittelman, Digital Avionics Systems Conference, Oct. 1995.

"Minutes of SC-186 WG-2 (TIS-B) Meeting", Jun. 13-14, 2000.

Airfield Pavement: Keeping Nations Runways in Good Condition Could Require Substantially higher Spending, GAO/RCED-98-226, Jul. 1998.

Albany International Airport Pavement Management System, Albany, New York, Albany International Airport GIS-Based Pavement and Facilities Management , Fall, 2002.

Albany International Aiport, New York, Uses GIS for Pavement Management, Lena Weber, Ph.D., GIS Manager, and Pat Rooney, GIS/GPS Technician, C.T. Male Associates, Summer, 2002, http://www.esri.com/news/arcnews/summer02articles/albany-airport.html.

Micropaver, Dr. M.Y. Shahin, CECER-CFF Champaign, IL May 2, 2005.

Raytheon Systems Limited Launches A Unique Solution For ADS-B, Jan. 19, 2005, Raytheon Corp. http://www.raytheon.co.uk/highlights/ATMS.html.

Raytheon Systems Liminted's ADS-B Solution Prised by International SIR TZRAFFIC Authorities, Feb. 2, 2005, http://www.raytheon.co.uk/news_room/news/press_02022005.pdf.

Boeing Subsidiary and Megadata Announce Joint Marketing Agreement, Press Release, Aug. 7, 2003.

Federal Airways & Airspace Inc. Because Accuracy Matters. Feb. 2003. Jan. 2002.

VDL4 TM Alignment With DO-242A (RTCA ADS-B MASPS) WG51/SG2, NASA, Sep. 2003.

Method to Provide System-Wide ADS-B Back-up, Validation, and Security, A. Smith et al. 25$^{th}$ AIAA/IEEE Digital Avionics Systems Conference Oct. 15, 2006.

*Positive Identification of Aircraft on Surface Movement Area—Results of FAA Trials*, 10th Annual International AeroSense Symposium, Orlando, Florida, Apr. 1996.

*Surveilliance Monitoring of Parallel Precision Approaches in a Free Flight Environment*, AIAA 16th Annual Digital Avionics Systems Conference, Oct. 1997.

*Analysis of ADS-B, ASDE-3 and Multilateration Surveillance Performance*—NASA Atlanta Demonstration Presented at the AIAA 17th Annual Digital Avionics Systems Conference in Oct. 1998.

*Application of ADS-B for Airport Surface Surveillance*, Daniel Hicok, Derrick Lee IEEE AIAA 17$^{th}$ Annual Digital Avionics Conference, 1998.

*Atlanta Hartsfield International Airport—Results of FAA Trials to Accurately Locate/Identify Aircraft on the Airport Movement Area*, IEEE Plans, Atlanta, GA, Apr 1996.

*Evaluation of Airport Surface Surveillance Technologies*, IEEE Radar 96 conference, Beijing, China, Oct. 1996.

*Improved Location/Identification of Aircraft/Ground Vehicles on Airport Movement Areas—Results of FAA Trials*, Institute of Navigation in Santa Monica, CA, Jan. 1996.

*Sensis News*, http://www.sensis.com/docs/128/ © 1999-2006.

*Roke Radar, Design and development of miniature radars and fuze sensors through to major radar programme builds*, http://www.roke.co.uk/skills/radar/, © 2006.

*Acoustic System for Aircraft Detection and Tracking, based on Passive Microphone Arrays*. Caronna, Rosello, Testa, 148$^{th}$ Meeting of the Acoustical Society of America, http://pcfite.ing.uniroma1.it/upload/research/4psp71107948 2021710.pdf Nov. 2004.

*Cei-Loc How We Do it, Technology Overview*, http://www.cell-ioc.com-how_tech.html, Oct. 2, 2006 (original date unknown).

*Super-Radar, Done Dirt Cheap*, http://www.businessweek.com/magazine/content/03_42/b3854113.htm BusinessWeek Online, Oct. 20, 2003.

*Methods To Provide System-Wide ADS-B Back-up, Validation and Security*, A. Smith, R. Cassell, T. Breen, R. Hulstrom, C. Evers, 25$^{th}$ AIAA/IEEE Digital Avionics Systems Conference, Oct. 15, 2006.

Damarel Systems International, LTD, Travel Automation Specialists, © 2004, www.dameral.com.

Airfield Pavement Computer Software, Mar. 23, 2005, Transport Canada https://www.tc.gc.ca/CivilAviation/International/Technical/Pavement/software.htm.

ARA Transportation, © 2004, http:/www.araworldwide.com/expertise/industry/transportation.htm.

*The Twilight Zone, Can Wide-Area Multilateration Systems Become A Nightmare for MSSR Producers*? Aircraft Traffic Technology International 2005, Vladimir Manda, Viktor Sotona.

*Safety, Performance, and Interoperability Requirements Document for ADS-B NRA Application*, European Organisation for Civil Avaiation Equipment, Dec. 2005.

Passive Surveillance Using Multilateration, Roke Manor Research website (2003).

Letter from Marc Morgan, Siemens, Feb. 10, 2006.

*Required Navigation Performance (RNP) and Area Navigation (RNAV)*, Boeing, Aug. 2000.

*System-Wide ADS-B Back-Up and Validation*, A. Smith, R. Cassell, T. Breen, R. Hulstrom, C. Evers, 2006 Integrated Communications, Navigation, and Surveillance Conference.

Required Navigation Performance (RNP) Another step towards global implementation of CNS/ATM, Anita Trotter-Cox, Assessment Compliance Group, Inc. Published in Professional Pilot Magazine, Jun. 1999.

EXTENSION OF AIRCRAFT TRACKING AND POSITIVE IDENTIFICATION FROM MOVEMENT AREAS INTO NON-MOVEMENT AREAS

CROSS-REFERENCE TO RELATED APPLICATIONS

This application is a Continuation-In-Part of U.S. patent application Ser. No. 11/492,711, filed Jul. 25, 2006, and incorporated herein by reference; This application is a Continuation-In-Part of U.S. patent application Ser. No. 11/429,926, filed on May 8, 2006, and incorporated herein by reference; This application is a Continuation-In-Part of U.S. patent application Ser. No. 11/343,079, filed on Jan. 30, 2006, and incorporated herein by reference; This application is also a Continuation-In-Part of U.S. patent application Ser. No. 11/342,289 filed Jan. 28, 2006 and incorporated herein by reference; This application is a Continuation-In-Part of U.S. patent application Ser. No. 11/209,030, filed on Aug. 22, 2005, and incorporated herein by reference; This application is a Continuation-In-Part of U.S. patent application Ser. No. 11/257,416, filed on Oct. 24, 2005, and incorporated herein by reference; This application is a Continuation-In-Part of U.S. patent application Ser. No. 11/203,823 filed Aug. 15, 2005 and incorporated herein by reference; This application is a Continuation-In-Part of U.S. patent application Ser. No. 1/145,170 filed on Jun. 6, 2006 and incorporated herein by reference; This application is a Continuation-In-Part of U.S. patent application Ser. No. 10/743,042 filed Dec. 23, 2003 and incorporated herein by reference; application Ser. No. 10/743,042 is a Continuation-In-Part of U.S. patent application Ser. No. 10/638,524 filed Aug. 12, 2003 and incorporated herein by reference; application Ser. No. 10/638,524 is a Continuation of U.S. patent application Ser. No. 09/516,215 filed Feb. 29, 2000 and incorporated herein by reference; application Ser. No. 09/516,215 claims is a Non Prov. of Provisional U.S. Patent Application Ser. No. 60/123,170 filed Mar. 5, 1999 and incorporated herein by reference; application Ser. No. 10/743,042 is a Continuation-In-Part of U.S. patent application Ser. No. 10/319,725 filed Dec. 16, 2002 and incorporated herein by reference. Application Ser. No. 10/743,042 is a Non Prov. of Provisional U.S. patent application Ser. No. 60/440,618 filed Jan. 17, 2003 and incorporated herein by reference.

FIELD OF THE INVENTION

The invention relates to the field of aircraft and ground vehicle tracking and surveillance. The present invention is directed toward methods, techniques and apparatus to extend the positive identification and tracking of aircraft from movement areas into the non-movement areas.

BACKGROUND OF THE INVENTION

Prior Art air traffic control systems are geared up to track planes in the air and on runway surface areas to optimize efficiency and provide safety. Safety is assured by "separation" whereby air traffic controllers employ various procedures and technologies to make sure that aircraft are physically separated by a minimum distance. At most airports, the responsibility of air traffic control starts and stops at the entrance or exit to the runway movement areas, which are taxiways and runways.

This is a practical matter, and in the non-movement areas, such as hangers, ramps, and aprons, aircraft movements and separation are no longer the responsibility of air traffic control, but is the responsibility of other parties such as the airport itself, airlines, or other parties. The use of tracking technologies for air traffic control is therefore focused on the movement areas, not the non-movement areas, where there are limitations in aircraft tracking. Furthermore, many of the aircraft transmitting devices are switched off in non-movement areas exacerbating tracking problems in these areas.

Airport airside operations are conducted on movement areas and non-movement areas. Movement areas refer to the airport's runways and taxiways and non-movement areas refer to the aprons, ramps, maintenance facilities, de icing facilities and other areas. One of the main differences between movement and non-movement areas is that usually Air Traffic Control (ATC) is responsible for separation and safety of aircraft in the movement areas, whereas the airport or other organization is responsible for operations in the non-movement areas. This is exemplified at a typical airport where the airport's ramp management will authorize an aircraft for push back, and the aircraft will taxi to a point at the edge of the controlled movement area, and the pilot will then contact ATC by radio to request clearance to proceed into the movement area for departure.

Figure 1:
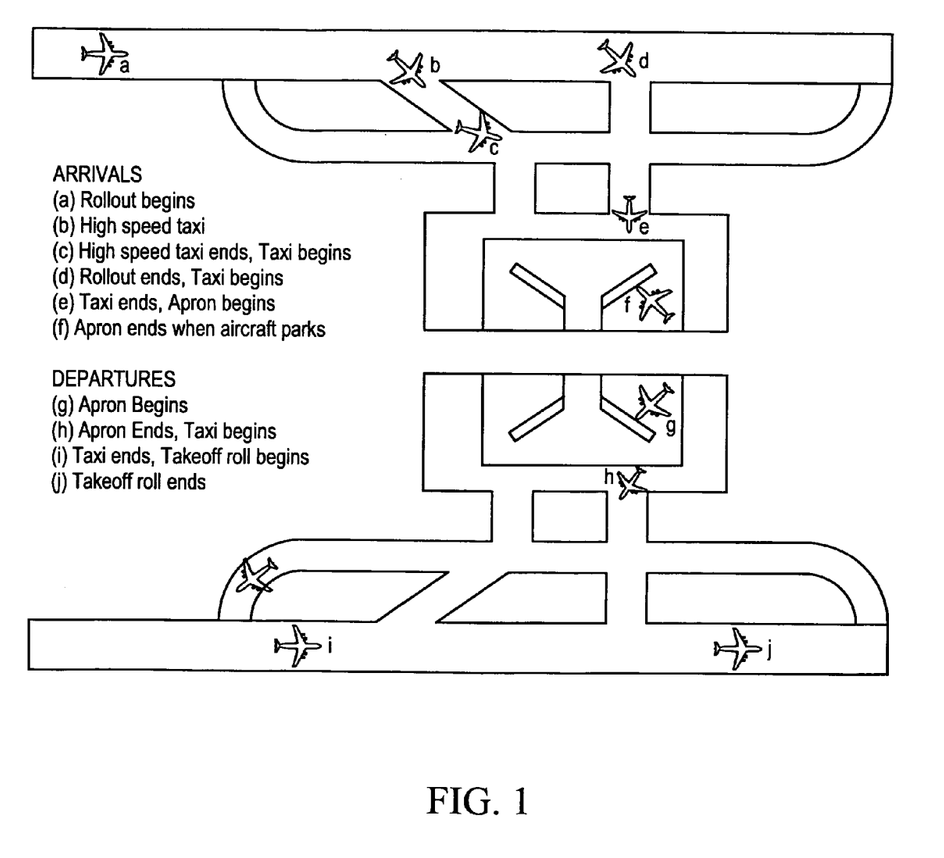
FIG. 1 illustrates, in a simplified form, the airport movement areas, and, enclosed within dashed lines, the non-movement areas.

Movement and non-movement areas are described the RNP report *Development of Airport Surface Required Navigation Performance (RNP)*, by Rick Cassell, Alex Smith, and Dan Hicok, Rannoch Corporation, Alexandria, Va. (NASA/CR-1999-209109, National Aeronautics and Space Administration, Langley Research Center, Hampton, Va. 23681-2199, Prepared for Langley Research Center under Contract NAS1-19214), incorporated herein by reference. FIG. 1 is taken from the Cassell et al., reference and illustrates, in a simplified form, the airport movement areas, and, enclosed within dashed lines, the non-movement areas.

Since Air Traffic Control (ATC) is responsible for the movement areas, the air traffic control infrastructure is optimized to provide communications, navigation, and surveillance in the movement areas, not the non-movement areas. Therefore at a typical larger airport there exists aircraft tracking and identification systems providing generally good coverage over the movement parts of an airport, but generally not throughout the non-movement areas.

The technologies that are currently used at airports for tracking in the movement areas are classified as cooperative, primary active, and passive. Cooperative technologies interact with devices on the aircraft, primary active technologies do not interact but use a form of transmission to reflect signals from aircraft, and passive technologies are receive only. Passive can include reception of any electromagnetic, radio, or radar transmission from an aircraft including, but not limited to those for communication, navigation, and surveillance, including signals that may be reflected from the aircraft.

Cooperative technologies include transponder-based systems such as ADS-B and multilateration as described in the following papers, all of which are incorporated herein by reference.

*Analysis of ADS-B, ASDE-3 and Multilateration Surveillance Performance*—NASA Atlanta Demonstration Presented at the AIAA 17th Annual Digital Avionics Systems Conference in October, 1998.

*Application of ADS-B for Airport Surface Surveillance*, AIAA 17th Annual Digital Avionics Systems Conference, October 1998.

*Surveillance Monitoring of parallel Precision Approaches in a Free Flight Environment*, AIAA 16th Annual Digital Avionics Systems Conference, October 1997.

*Evaluation of Airport Surface Surveillance Technologies*, IEEE Radar 96 conference, Beijing, China, October 1996. This paper reviews the evolving requirements for airport surveillance systems, particularly the use of the Required Surveillance Performance (RSP) concept.

*Positive Identification of Aircraft on Surface Movement Area—Results of FAA Trials*, 10th Annual International AeroSense Symposium, Orlando, Fla., April 1996

*Atlanta Hartsfield International Airport—Results of FAA Trials to Accurately Locate/Identify Aircraft on the Airport Movement Area*, IEEE PLANS, Atlanta, Ga., April 1996.

*Improved Location/Identification of Aircraft/Ground Vehicles on Airport Movement Areas—Results of FAA Trials*, Institute of Navigation in Santa Monica, Calif., January 1996.

In 2000, in the United States, the FAA awarded a contract to Sensis for a surface multilateration system under the program name of ASDE X. The Airport Surface Detection Equipment-Model X (ASDE-X) program was initiated in 1999 and Sensis Corporation was selected as the vendor in the year 2000. The Senate Committee on Appropriations, in its report on FAA's fiscal year (FY) 2006 appropriations, expressed concern about the pace of ASDE-X deployment and reported the FAA has not yet deployed systems to more than half of the planned sites due to changes in system design and additional requirements.

Figure 2:
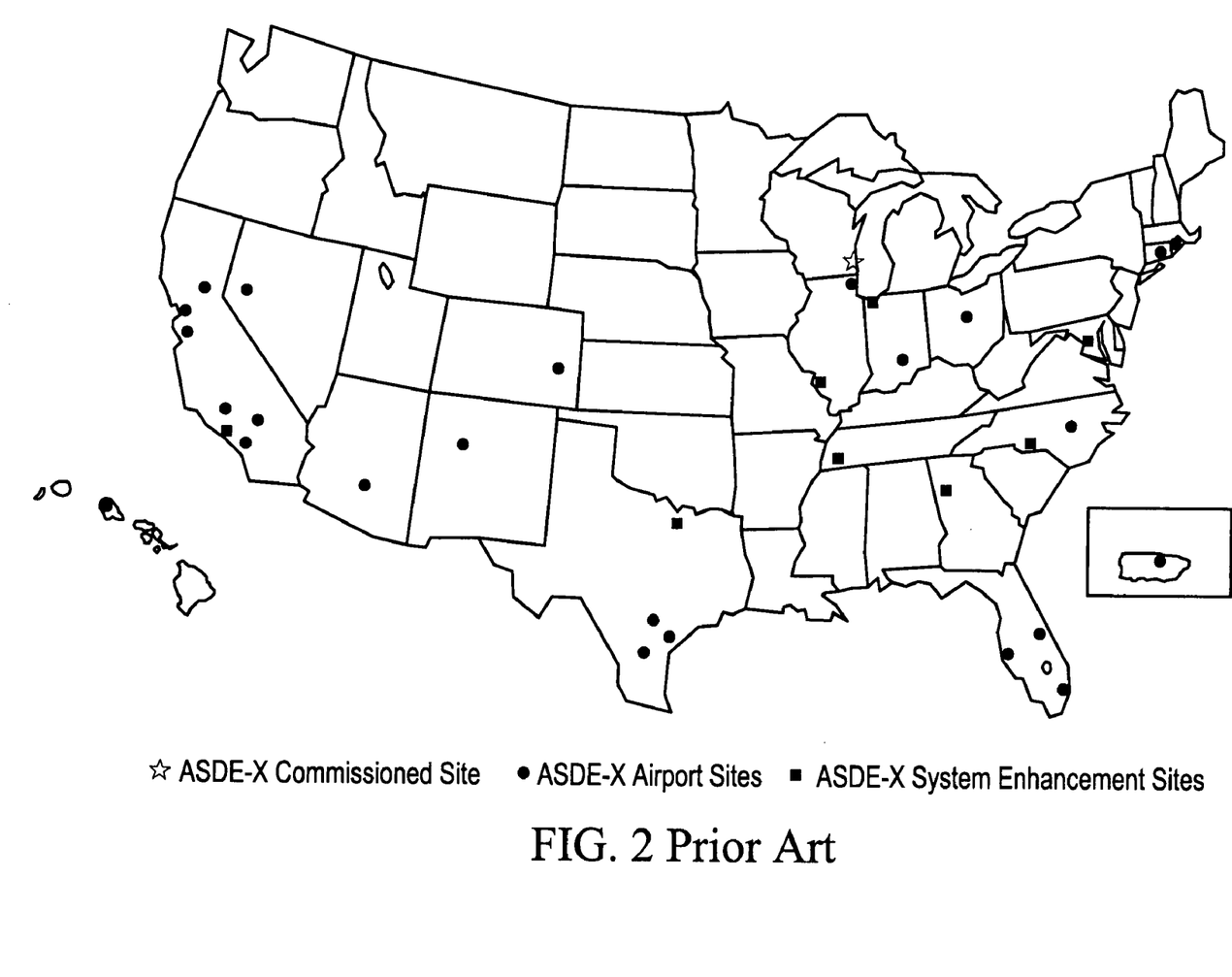
FIG. 2 is a map of planned ASDE-X installations (from www.asdex.net) as well as upgrades to the older ASDE-3 systems.

The FAA originally planned to complete ASDE-X deployment to second-tier airports (e.g., Orlando International Airport and Milwaukee General Mitchell International Airport) by FY 2007 as a low-cost alternative to Airport Surface Detection Equipment-3 (ASDE-3) radar systems, which are deployed at larger, high-volume airports. However, the FAA now plans to complete deployment by FY 2009, a two-year delay. While the FAA has already procured 36 out of 38 ASDE-X systems, only 3 systems have been commissioned for operational use as of late 2005. As of 2005, the FAA has invested about $250 million in ASDE-X and expects to spend a total of $505 million to complete the program. A map of planned ASDE-X installations (from www.asdex.net, see http://www.sensis.com/docs/128/) as well as upgrades to the older ASDE-3 systems is illustrated in FIG. 2.

Primary technologies include Radar systems such as X-Band radar (see www.terma.com, incorporated herein by reference), as well as millimeter wave radar (see www.flight-refuelling.com, www.qinetic.com, and www.transtech-solutions.com, incorporated herein by reference). Some companies also use a combination of active sensors for detecting items on airport surfaces, for example debris. Roke Manor has a mobile system as detailed in U.S. patent application Ser. No. 10/494,271, Publication No. 20050046569, entitled "Detection of undesired objects on surfaces" published Mar. 3, 2005 and incorporated herein by reference. Qinetiq has an active system slated for Vancouver Airport to detect runway debris (See, www.qinetic.com, incorporated herein by reference).

Passive technologies include inductive loops buried in the surface as well as camera technology, both of which are described in the following papers, both of which are incorporated herein by reference:

*Inductive Loop Sensor Subsystem (LSS) as a Supplemental Surface Surveillance System —Demonstration Results*, AIAA 19th Annual Digital Avionics Systems Conference, October 2000.

*Evaluation of FLIR/IR Camera Technology for Airport Surface Surveillance*, 10th Annual International AeroSense Symposium in Orlando, Fla., April 1996.

Existing techniques for runway occupancy determination include the use of zones as described in U.S. Pat. No. 6,927,701, entitled "Runway occupancy monitoring and warning," issued Aug. 9, 2005, and incorporated herein by reference. Techniques for passive tracking using "bounced" signals include Roke Manor's triangulation techniques as described in U.S. Pat. No. 6,930,638, entitled "Passive moving object detection system and method using signals transmitted by a mobile telephone station," issued Aug. 16, 2005, and also incorporated herein by reference.

Given the delays in the rollout of the ASDE-X program, as well as questions as to its operability, other techniques may be required to insure that aircraft can be accurately tracked throughout an airport, in movement and non-movement areas. Collisions between aircraft and other aircraft, service vehicles, buildings, or the like, can have devastating consequences, even at taxiing speeds. Moreover, even minor damage caused by such collisions may require expensive repairs and delay flights considerably. A system is needed which can accurately track aircraft in both movement and non-movement areas, which does not necessarily rely upon a single signal or technology. Such a system should be robust, redundant, inexpensive, and easy to install.

Cell phones, PDAs and other personal communication devices may soon have no limits on their use on airplanes. If regulations allow, cell phones and other radio devices may be approved for in-flight use during most or all phases of flight. If this use is allowed, then an additional set of radio signals may be emitting from an aircraft. In addition, some phones have added a GPS chip to aid in determining their locations and for compliance with the enhanced 911 requirements.

Air France is slated to trial OnAir passenger mobile phone use. Air France will take delivery of an A318 fitted with OnAir equipment in early 2007 that will enable the use of passenger mobile phones in-flight. The airline will then use the aircraft to conduct a six-month commercial trial using the new service on short-haul flights within Europe and to and from North Africa.

The OnAir service will allow Air France passengers to use their own GSM (global system for mobile communications) phones and GPRS (general packet radio service)-enabled devices such as the Blackberry or Treo, to make and receive voice calls or to send and receive SMS (short message service) communications, or emails during the flight, without inferring with critical aircraft systems.

SUMMARY OF THE INVENTION

The present invention is directed toward methods, techniques and apparatus to extend the positive identification and tracking of aircraft from movement areas into the non-movement areas. By using the data fusion process pioneered by Rannoch Corporation, assignee of the present application, a number of different signal sources may be used to provide aircraft tracking information for both movement and non-movement areas in and near an airport (as well as in flight). Such a system does not need to rely upon a single signal source, such as a transponder. Thus, if a pilot turns off a transponder upon landing, the system may still be able to track such an aircraft on the ground, using other signals emanating from, or reflected by, the aircraft.

In one aspect of the present invention, a system or systems, for determining an aircraft's position and/or identification, composed of the following data sources and combinations of these sources:

Single AirScene sensor combined with optical sensor or sensors

Multilateration in combination with optical sensor or sensors

Optical sensor or sensors combined with ADS-B data

ASDI (ETMS) combined with optical sensor and MLat

ASDI (ETMS) combined with optical and single sensor

Collocated AirScene sensor or sensors and optical sensor or sensors

Voice recognition for registration number (previous Rannoch patent) combined with optical sensor or sensors UAT 978 MHz/1090 MHz transmissions combined with optical sensor or sensors Passive broadband and narrowband multilateration using the TDOA principle for a variety of high frequency aircraft signals including data link, DME, SSR, search, target, and weather radar, and other emitters.

Logs (either electronic or hand written) from FBOs, airport personnel, catering or other operators at the airport that describe which aircraft were where and when they were there.

Logs include registration number and time from which landing or departure time could be determined.

The comparison of one, or a combination of the sources above would result in a dynamic performance assessment of the accuracy of any of the sources relative to the others or known good source or sources. Such a system could be used to rate how well an identification is known and those not well known could be submitted for human intervention.

Prevalent aircraft and commercial technologies rely on analog and digital communications from the aircraft and other sources at the airport. For example, it was reported in the *Journal of Air Traffic Control* in 2005 that a possible source of surface accidents was due to proximate communicating with ATC and airport authorities on separate discrete analog frequencies, known to various parties at the airport but unknown to each other. In one embodiment of the present invention, by monitoring frequency use around an airport, it is possible to identify, on automated basis, if aircraft, within the same zone, are using different communications frequencies and therefore possibly unaware of one another. In addition to VHF analog or digital communications, possible channels of communication include reception of various communications signals emanating from the aircraft including ACARS and CPDLC.

In another embodiment of the present invention, commercial cell phones and other personal communication devices provide another source of aircraft position information in the non-movement area. Depending on the aviation authority, cell phones are permitted for use at the gate, the non-movement area, or the movement areas. It is anticipated that that cell phones may shortly be approved for use in all phases of flight.

Presently, however, at the very least, cell phones become active when an aircraft's wheels touch down in the movement area. By correlating an aircraft ID and at least one onboard cell phone on board (the aircraft and cell phone have the same position, speed, and direction) before the aircraft's transponder is turned off, it can be tracked all the way to the gate by following the cell phone, even if the aircraft turns off its transponder. This form of cell phone tracking can be used as a backup to other tracking techniques, as there may be situations where no cell phones are active on a given aircraft during taxiing. Logic may be used to associate a group of cell phones being tracked with an aircraft. Cell phones may be associated with aircraft based on multiple parameters such as location, time, speed, direction, and other factors.

The use of cell phones in an aircraft tracking system extends the ability to track the aircraft by 1) determining which airplane a given cell phone is on by using the fusion of multiple tracking sources; 2) tagging that aircraft with the aircraft identification information for the duration of the flight; and 3) using constantly updated cell phone tracking services and systems to maintain GPS track of aircraft from gate to gate.

For example, some phones have added a GPS chip to aid in determining their locations and for compliance with the enhanced 911 requirements. The cell phone companies or the services that access their data may get updates from a number of these types of phones while they are operating from the airplanes. This data may provide a highly accurate flight track of the aircraft via the cell phone network for the entire flight and all ground movements. The technology used to transmit the cell phone calls from on board the plane will be transmitting for the entire flight to maintain the service. Multilateration techniques may be used to track this known source even after the 1090 MHz transponder has been turned off in the non-movement or gate areas.

The enhanced 911 system requirements have spawned a lot of investment in cell phone location systems. Some are based on embedded GPS chips in the phones while others use triangulation/multilateration. There are a number of companies that provide location services by contracting with the cell phone providers and many state transportation systems are using this type of system to identify traffic backups based on the cell phones. This information may be used to track aircraft in the present invention. Likewise other devices using various transmissions such as 80211 devices may be tracked and associated with an aircraft.

An example of third party cell location service provider is illustrated at http://www.cell-loc.com/how_tech.html, incorporated herein by reference.

Note that in the cell phone tracking embodiment of the present invention, idea, it is not necessary to track any particular or known individual (in most instances), only to determine the anonymous location, speed, direction of as many phones as possible that are tracking together, indicating they are all on the same vehicle, or those that are tracking along with the know location of a vehicle. This applies to the tracking on the surface as well as in the air. The present invention may operate interactively with cell phone tracking systems to discover coincident targets and assign an identification based on the location and identification data from other independent sources. This track would be maintained as long as possible or until a certain condition was met. Thus, privacy concerns of individual cell phone users are protected.

For example, once it is determined that a number of phones are tracking together and/or those particular phones are located at the same location and have the same speed and direction as a vehicle identified by the system through other means, those phones are assigned to that vehicle and their positional information and any available vehicle identification information is grouped, tracked, and stored in the system. In the case of an airplane, the system could be set to terminate the tracking when phones were no longer on the same vehicle or the location of the vehicle was determined to be at the terminus of its travels.

Other passive tracking technologies useful for tracking aircraft on the ground as part of the transition from movement to non-movement areas are described in *Super-Radar, Done Dirt Cheap*, http://www.businessweek.com/magazine/content/03_42/b3854113.htm Business Week Online, Oct. 20, 2003, incorporated herein by reference. This technology is not able to determine the details of the aircraft it is tracking, but once this data is integrated into the present invention the aircraft may be tagged up with its identification information from our other sources.

Aircraft also continuously emit signals from on-board navigation devices such as Distance Measurement Equipment (DME). While these signals do not identify a specific aircraft they do contribute to the overall track update. Once an aircraft has been identified by other signals (e.g., transponder or any other emissions from the aircraft or reflected by the aircraft) and a track established, these other signals, such as DME signals, can be used to maintain the track, even if the transponder is turned off. Information on the operation of DME is provided in http://www.faa.gov/ATpubs/AIM/, incorporated herein by reference.

In another embodiment of the present invention, aircraft may be tracked using reflected cell phone signals. Some organizations have researched the use of passive cell phone Radar. For example, Roke Manor Research, has developed a system (called CellDar as a trade mark by Roke Manor) for tracking cars on highways as documented in the flowing web pages, all of which are incorporated herein by reference:

http://www.roke.co.uk/sensors/stealth/celldar_traffic.asp http://www.roke.co.uk/sensors/stealth/cell_phone_radar_concept.asp http://www.roke.co.uk/sensors/stealth/celldar_coastal.asp http://observer.guardian.co.uk/uk_news/story/0,6903,811027,00.html (Note that some of these web pages appear to have been removed. However, discussion of CELLDAR can still be found at Roke RADAR, Design and development of miniature radars and fuze sensors through to major radar programme builds, http://www.roke.co.uk/skills/radar/, © 2006, also incorporated herein by reference).

In one embodiment of the present invention passive cell phone radar is applied as another aircraft source of position and velocity of the aircraft, which may be combined with other data to produce an aircraft track.

Optical systems have been employed to identify and track aircraft, with limited success. One of the issues with optical systems is the accuracy of the system, taking into account the many variables in terms of tail number size, placement, dynamic position with regard to camera, lighting, weather and other issues. Therefore, many vendors of these systems require that a human be in loop to do the identification or verify the automatic identification in cases where the computer was not able to do recognize the registration number with a high probability.

Using a combination of Mode S decoding, through ADS, multilateration, single sensor, ETMS, ASDI, broadband multilateration or airport systems such as gate management systems, it is possible to simultaneously decode an aircraft's tail number using multiple flight tracking and optical techniques. For those aircraft equipped with Mode S, the complete and integrated system can track its own performance by comparing the electronic decode of registration number to the optical decode. The integration of multiple tracking sources, with an optical system also allows the optimization of the optical system and reduces the cost of such a system by minimizing the amount of human intervention required. Only those aircraft not already recognized by the other methods and not automatically recognized by the optical tracking system would require the expense of human involvement.

For example, a Mode S equipped aircraft departs from a particular airport. That aircraft's registration number is easily recognized and tracked by the MLAT or ADS systems. The optical system also detects the aircraft and but might not automatically recognize the registration number with a high degree of accuracy. In an optical only system, this aircraft ID would be flagged as missed or low confidence and a human operator would then have to physically look at the pictures to try to determine the registration number. If the optical system were integrated with other tracking sources that did make a positive identification, this aircraft would not be flagged by the system and no human would be required to manually read the registration number. This embodiment significantly improves the efficiency and capacity of an operator who would have wasted time to visually review photographic data for an aircraft that was already positively identified by other means.

The system may also be used to detect cases when the aircraft was squawking a registration number that was different than that painted on the side of the aircraft. Warnings would be automatically generated and sent to the owner/operator or to the authorities.

Comparison of the different registration number acquisition techniques at a particular airport during a specific time period, during specific conditions (weather, lighting, etc.) may show that the optical system operates with a high performance for the known Mode S aircraft it may be practical to skip or reduce the level of human-in-the-loop review for non Mode S aircraft during these particular periods. This measured confidence in the optical recognition system may vary as conditions changed and when the confidence fell below a certain level, the system may automatically call for more human intervention. This kind of dynamic performance measurement allows the operator to focus on other tasks and increase the efficiency and capacity of that operator. The converse is also true. During bad visual conditions, the dynamic performance measurement results will indicate a poor performance from the optical system. This feedback would warn the optical system that its performance was degrading and different optimizations could be tried until the percent positively recognized, as calibrated against known good identifications from the flight tracking system, improved.

A history of performance for each device under each condition will also help determine where and when to improve the system. For instance, some optical devices may work perfectly with high accuracy where others do not. Different systems could be fitted until the performance was improved and verified in real world conditions through comparison with the flight-tracking database.

An integrated system that can positively track the arrival and/or departure of a high percentage of aircraft can be used to reliably monitor the activity of an individual aircraft. The integration of aircraft ID and tracking systems with logs of fuel use and filed flight plans will allow the system to automatically detect and identify discrepancies in the data based on the know performance characteristics of an individual aircraft.

The system may also be used to warn/notify the operator that an aircraft of interest is landing or departing. This is useful for catching scofflaws, slow payers, non-payers, or any aircraft operator of interest based on the information in the system. Using multiple installations and fusing ETMS data, billing data, FBO data etc., the system can tell where an aircraft went, if it went were it was supposed to, if it used an appropriate amount of fuel to get there, and the like. Applications include law enforcement, security, on the spot debt collection and the like.

For example, through its various data sources, the system determines a particular aircraft is about to land or take off. The operator/owner of this aircraft is over due with a use fee payment. The system may automatically warn on-field operations that this aircraft was active and the debt could be collected immediately while still on the field. This warning message may be sent by electronic means or voice commands and could include the amount of the debt and the aircraft's exact location.

Security applications may include the detection of aircraft whose fuel use, as determined through acquisition of the fuel use figures from the airport's fuel supplier, did not match the origin destination as filed on their flight plan. This would indicate that the aircraft deviated from the flight plan, possibly for illicit purposes.

The following references, all of which are incorporated herein by reference, are related to acoustic and vibration tracking of aircraft in the air and on the ground:

http://www.arl.army.mil/cgi-bin/tto/dtttest/
db.pl?db=default&view_records=2&ID=1076

*Acoustic System for Aircraft Detection and Tracking, based on Passive Microphone Arrays*. Caronna, Rosello, Testa, 148th Meeting of the Acoustical Society of America, http://pcfite.ing.uniromal.it/upload/research/
4psp71107948 2021710.pdf November 2004

Michel, U.S. Pat. No. 4,811,308, issued Mar. 7, 2989.

The output from these types of systems, when combined and fused with the other sources of aircraft tracking information already included in the AirScene™ system, provides another independent source of positional information that can be compared and contrasted with the tracking data from other sources to improve the capability of the system to track aircraft. Seismic tracking should be mentioned along with acoustic tracking. They are related to each other and to the multilateration techniques used by the AirScene™ and VERA-E systems to determine an aircraft's location by tracking the energy it emits or reflects.

Depending on the airport, Mode S identification can positively identify between 10% and 99% of the aircraft operating at or in the vicinity of the airport. Those not able to be positively identified by Mode S include aircraft squawking the wrong data, aircraft not equipped with Mode S technology (such as general aviation aircraft), foreign aircraft, and the like. But even these non Mode S aircraft are tracked by the multilateration system and stored as tracks with an unknown or non unique identification.

Utilizing the Mode S identification and tracking system to optimize the optical identification process was discussed previously but that such a system can also be used to augment identification data for the non Mode S aircraft tracked by the multilateration system. If an unidentified, but tracked aircraft, is also captured and identified by an optical tracking system or other system or method, the identification data can be positively associated to the flight track based on factors such as, but not limited to, time, location, speed, and runway. This feed back of identification data back into the multilateration system can significantly increase the identification capture rate and accuracy of the multilateration or other electronic aircraft tracking system.

Such a system can work in real time or in a post processing mode, depending on the time required for the non real-time tracking and identification system to determine the identification of the aircraft and for that data to be processed and associated with a captured flight track. The use of such a system significantly improves the tracking of non Mode S aircraft and would be especially useful at small airports, general aviation airports, or military airports where there is a higher percentage of non Mode S aircraft.

Other aircraft tracking systems also benefit from this method of identifying aircraft. Systems that track aircraft using methods that have no means of identifying an aircraft may benefit significantly from identification data supplied by these other means. Systems such as VERA-E system manufactured by ERA in the Czech Republic, track aircraft using passive broad band emissions that may not include any identification data.

The system also allows higher positive identification at airports where foreign aircraft operate. The Mode S identification relies on the ability of the system to resolve the aircraft registration number from the Mode S data being transmitted by that aircraft. Certain countries (United States, Australia, and Germany) have known algorithms that allow the system to compute the registration number where as others use a database that may not be available or is difficult or impossible to acquire. Utilizing an image capture system in combination with a multilateration, or other passive flight tracking system, allows the system to associate the electronically received Mode S identification with the actual registration number from the aircraft.

DETAILED DESCRIPTION OF THE INVENTION

Figure 3:
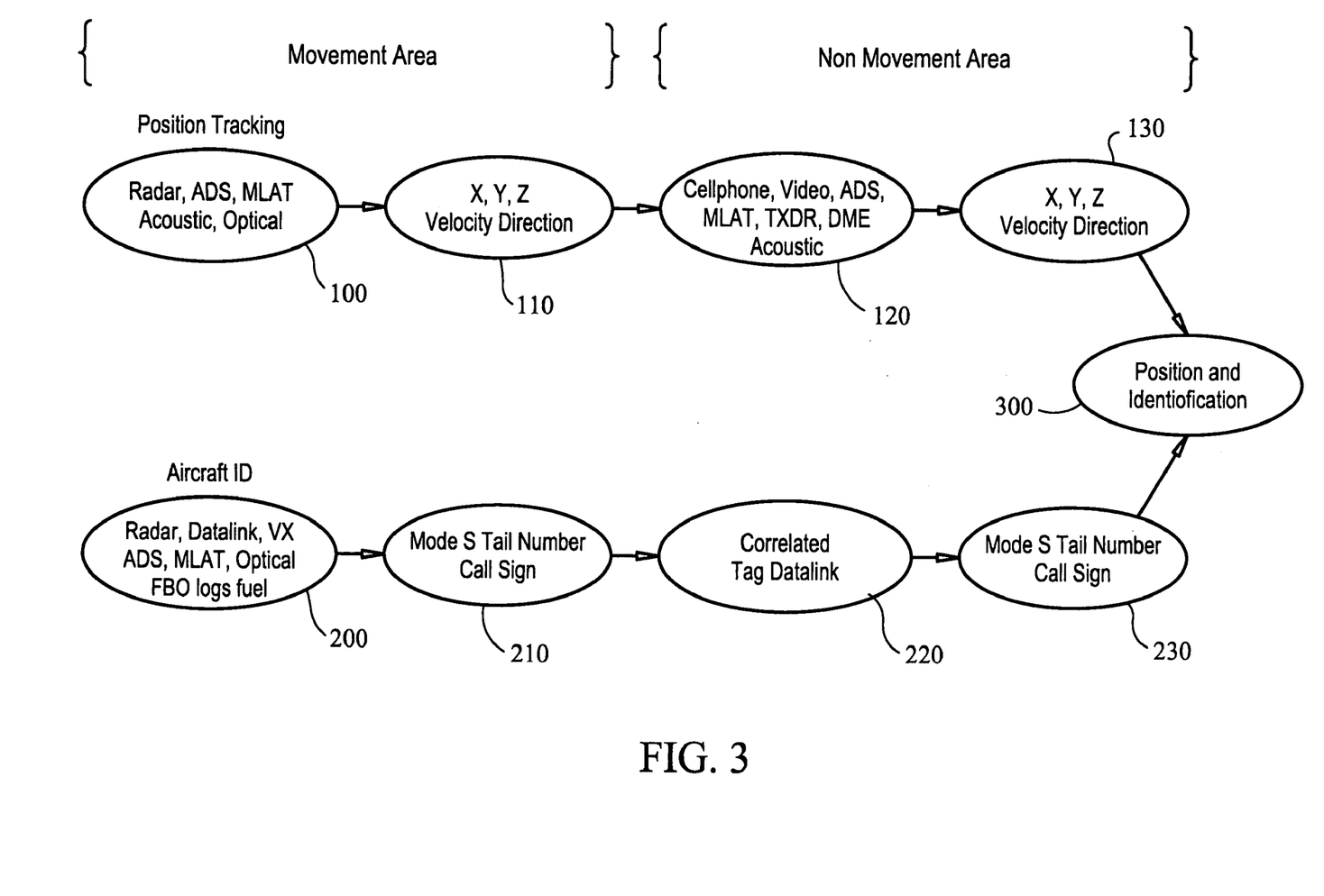
FIG. 3 sis a flow chart illustrating an embodiment of the invention as used for an aircraft arriving at an airport.

FIG. 3 is a flow chart illustrating shows an embodiment of the invention as used for an aircraft arriving at an airport. As the aircraft descends and lands it is tracked and identified on the movement area at the airport. Using a combination of ETMS, radar, MLAT, ADS, acoustical or optical tracking 100 the aircraft location is known 110. At the same time, the identification of the aircraft is known through a combination of systems and procedures 200 producing a variety of ways to identify the aircraft, either by its tail number, Mode S address or call sign 210.

As the aircraft transitions from the movement area to the non-movement area, a combination of unique signals may be used for tracking, such as navigation signals (DME), cell phone data, airport video or any other electromagnetic radiation broadcast from the aircraft 120 thus providing the aircraft's ground track 130.

As the aircraft moves from the movement area into the non-movement area the ID already established is transferred with the track of the aircraft, and may be verified by optical camera recognition, or through data link information, such as ACARS or CPDLC 220, 230. Together, these data provide a complete air traffic picture with position and identification, all the way to the aircraft gate 300.

If the aircraft transitions before the overlapping tracking and identification data can be solidly established, the probable ID can be established based on last known position, probable taxi route, optical camera recognition, parking or gate location, type of aircraft, airline, time of day, or gate management system input from an integrating gate management system data.

Figure 4:
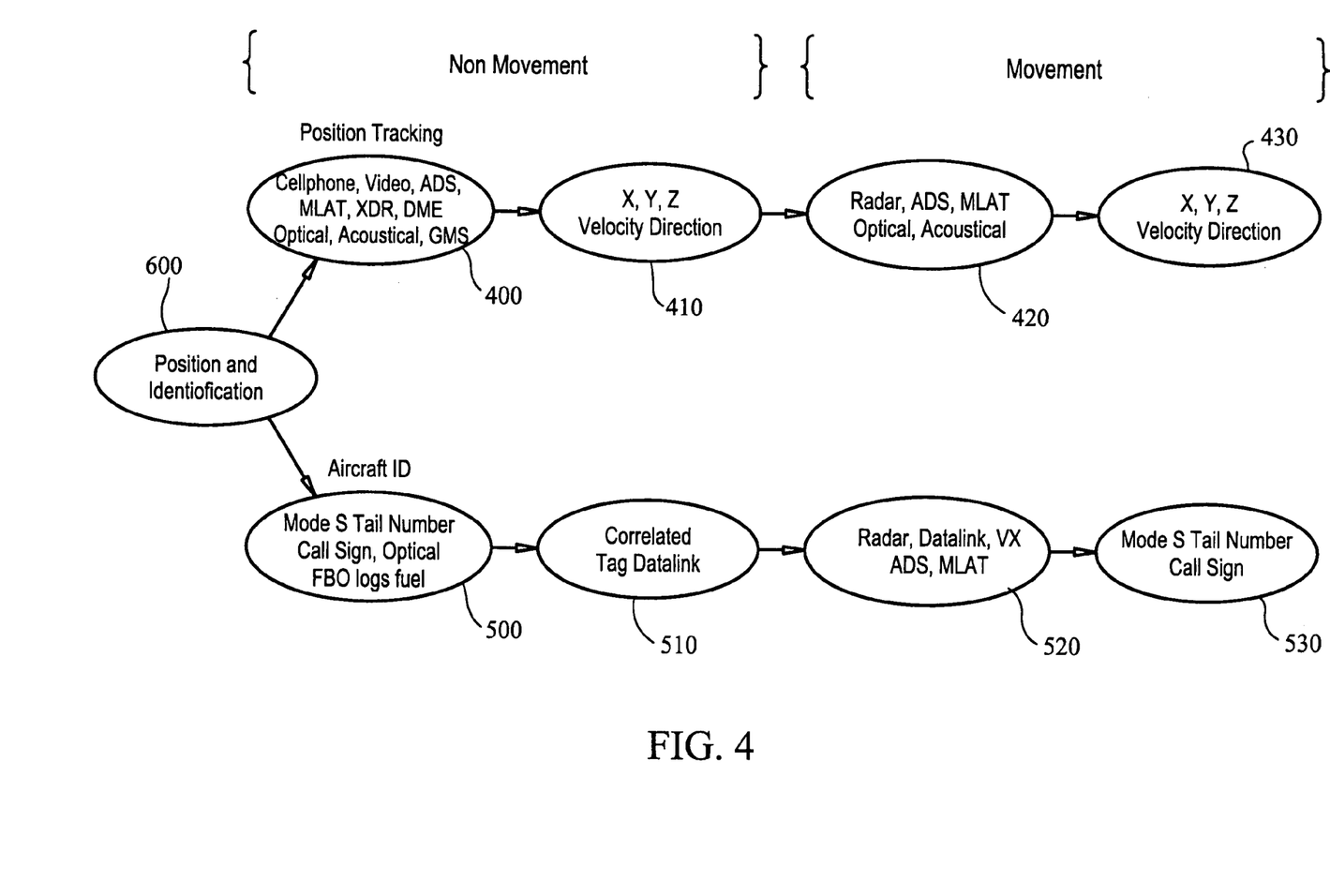
FIG. 4 is a flow chart illustrating an embodiment of the invention showing an aircraft on departure.

FIG. 4 is a block diagram illustrating an embodiment of the invention showing an aircraft on departure. As the aircraft sits at the gate or other location, its location and position are clearly known, and tagging of the aircraft may be accomplished manually or by using data from the gate management system (GMS) 600. As the aircraft pushes back certain system on the aircraft will be operating including navigation devices, perhaps transponders, and perhaps some cell phone or other commercial communications devices 400 providing an aircraft track 410. The manually tagged aircraft identification will follow the track of the aircraft 500, 510 and may be updated by ADS information, ACARS or CPDLC. As the aircraft enters the movement area (usually after receiving ATC clearance by voice or data link.) it can be tracked by conventional surveillance 420, 430 and identified accordingly, or through other techniques such as acoustical tracking, optical tracking, or voice communications (VX) 520, 530.

Figure 5:
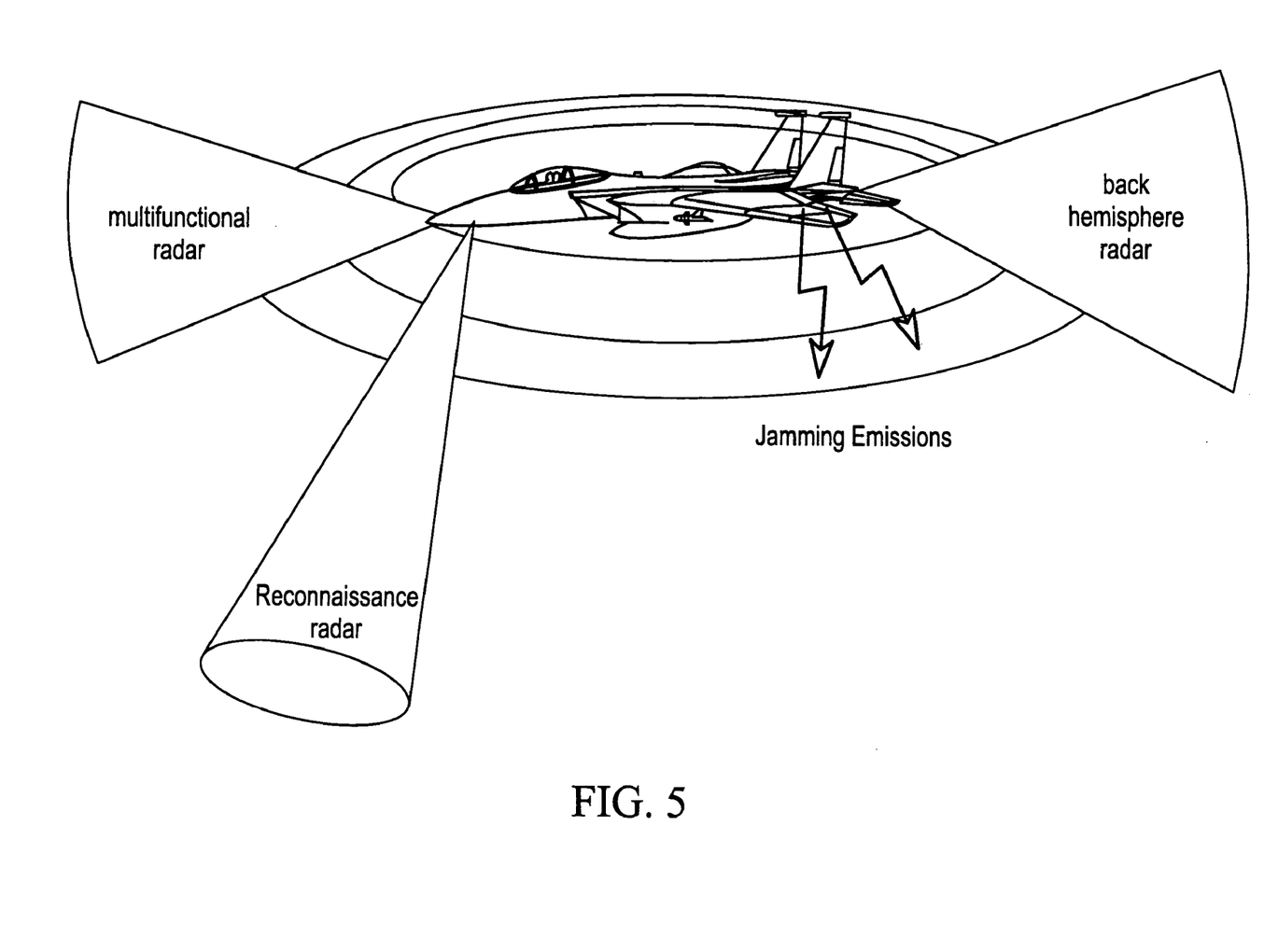
FIG. 5 is a drawing illustrating the different types of emissions possible from an aircraft on the ground or in the air.

FIG. 5 is an illustration showing the typical emissions from a modern aircraft as discussed in context of the present invention. Emissions can come from any system or direction. These emissions can be used in the present invention to identify an aircraft and also indicate aircraft position through multilateration and other means.

While the preferred embodiment and various alternative embodiments of the invention have been disclosed and described in detail herein, it may be apparent to those skilled in the art that various changes in form and detail may be made therein without departing from the spirit and scope thereof.

We claim:

1. A method for extending aircraft tracking from airport movement areas comprising one or more of taxiways and runways to non-movement areas comprising one or more of hangers, ramps and aprons, where aircraft position is previously detected and the aircraft previously identified in the movement area, the method comprising the steps of:

detecting a signal from the aircraft, determining position of the aircraft from the signal from the aircraft, associating the signal from the aircraft with the previous identification of the aircraft by comparing the previous detected position of the aircraft with the determined position of the aircraft, and generating a track for the aircraft from a movement area into non-movement area using the signal from the aircraft.

2. The method of claim 1, wherein the signal from the aircraft comprises one or more of an audio radio communications signal, a transponder signal, a cellular telephone signal, an ACARS signal, a CPDLC signal, a MLAT signal, a UAT signal, a UHF signal, a VHF signal, data link signal, an ADS signal, an acoustic signal, an optical signal, an interrogation signal, a radar signal, or any other emitter.

3. The method of claim 1, further comprising the steps of:

detecting a signal from the aircraft in a non-movement area comprising the one or more of hangers, ramps and aprons, determining position of the aircraft from the signal from the aircraft, generating a track for the aircraft in the non-movement area comprising one or more of hangers, ramps and aprons, receiving a detected aircraft position and identification when the aircraft moves from a non-movement area to movement area, associating the signal from the aircraft with the detected identification of the aircraft in the movement area by comparing the determined position of the aircraft with the detected position of the aircraft in the movement area, and merging the track for the aircraft from the non-movement area into the movement area.

4. The method of claim 1, further comprising the step of:

determining, from the signal from the aircraft, an identification of the aircraft; and comparing the identification of the aircraft with the previous identification of the aircraft, and detecting any discrepancy thereof.

\* \* \* \* \*